US012763642B1

(12) United States Patent
Ziegler

(10) Patent No.: US 12,763,642 B1
(45) Date of Patent: Oct. 13, 2026

(54) PRECISION TRACKING DEVICES, SYSTEMS, AND METHODS

(71) Applicant: TelemeTrak, Inc., Oakland, CA (US)

(72) Inventor: Frederick Steinway Ziegler, San Francisco, CA (US)

(73) Assignee: TelemeTrak, Inc., Oakland, CA (US)

( * ) Notice: Subject to any disclaimer, the term of this patent is extended or adjusted under 35 U.S.C. 154(b) by 42 days.

(21) Appl. No.: 18/610,044

(22) Filed: Mar. 19, 2024

Related U.S. Application Data

(63) Continuation-in-part of application No. 18/384,466, filed on Oct. 27, 2023, which is a continuation-in-part of application No. 17/468,326, filed on Sep. 7, 2021, which is a continuation of application No. 16/231,223, filed on Dec. 21, 2018, now Pat. No. 11,133,728.

(51) Int. Cl.

| | |
|---|---|
| ***F03D 9/25*** | (2016.01) |
| ***F03D 13/20*** | (2016.01) |
| ***H02K 7/18*** | (2006.01) |
| ***H02N 11/00*** | (2006.01) |

(52) U.S. Cl.
CPC ............... *H02K 7/183* (2013.01); *F03D 9/25* (2016.05); *F03D 13/20* (2016.05); *H02K 7/1823* (2013.01); *H02N 11/002* (2013.01)

(58) Field of Classification Search
CPC ........ H02K 7/183; H02K 7/1823; F03D 9/25; F03D 13/20; H02N 11/002
See application file for complete search history.

(56) References Cited

U.S. PATENT DOCUMENTS

2019/0317220 A1* 10/2019 Kocer .................... G01S 19/46

* cited by examiner

*Primary Examiner* — Michael C Zarroli
(74) *Attorney, Agent, or Firm* — The Law Office of Raul D. Martinez, PC

(57) ABSTRACT

Interested parties would like to track the location of one or more towed transport platforms continuously when they are in motion. Existing monitoring systems are powered by a combination of solar power, batteries, and intermittent tractor platform power for electrical power. All of these power sources have limitations in providing power when a towed transport platform is in motion. Solar power is not available at night. Batteries run out of energy and must be recharged. Tractor platform power is not always available to a towed transport platform. The embodiments of the invention convert the kinetic energy of a moving towed transport platform into electrical power, providing continuous power for a monitoring system to operate.

17 Claims, 33 Drawing Sheets

| Lux | I [A] | Voltage | Measured Power |
|---|---|---|---|
| 32 | 0.000 | 0.0170 | 0.006 |
| 95 | 0.001 | 0.0420 | 0.036 |
| 220 | 0.001 | 0.0580 | 0.069 |
| 240 | 0.002 | 0.0910 | 0.171 |
| 275 | 0.002 | 0.0750 | 0.116 |
| 300 | 0.001 | 0.0430 | 0.038 |
| 415 | 0.003 | 0.1530 | 0.483 |
| 650 | 0.004 | 0.1850 | 0.706 |
| 695 | 0.007 | 0.3200 | 2.111 |
| 750 | 0.004 | 0.1900 | 0.744 |
| 850 | 0.005 | 0.2500 | 1.289 |
| 960 | 0.005 | 0.2470 | 1.258 |
| 990 | 0.007 | 0.3300 | 2.245 |
| 1,000 | 0.006 | 0.2880 | 1.710 |
| 1,000 | 0.001 | 0.0660 | 0.090 |
| 1,160 | 0.008 | 0.3710 | 2.838 |
| 1,200 | 0.006 | 0.3080 | 1.956 |
| 1,500 | 0.008 | 0.3700 | 2.823 |
| 1,500 | 0.001 | 0.0430 | 0.038 |
| 1,590 | 0.002 | 0.0800 | 0.132 |
| 1,600 | 0.007 | 0.3250 | 2.178 |
| 1,700 | 0.001 | 0.0540 | 0.060 |
| 3,000 | 0.009 | 0.4600 | 4.363 |
| 3,000 | 0.002 | 0.1080 | 0.240 |
| 3,100 | 0.008 | 0.3900 | 3.136 |
| 3,300 | 0.001 | 0.0330 | 0.022 |
| 3,900 | 0.002 | 0.1000 | 0.206 |
| 4,200 | 0.002 | 0.1110 | 0.254 |
| 4,500 | 0.010 | 0.5000 | 5.155 |

FIG. 1A

| | | | |
|---|---|---|---|
| 5,200 | 0.006 | 0.3040 | 1.905 |
| 6,500 | 0.004 | 0.2000 | 0.825 |
| 7,500 | 0.004 | 0.1800 | 0.668 |
| 7,600 | 0.007 | 0.3600 | 2.672 |
| 8,500 | 0.008 | 0.4000 | 3.299 |
| 9,300 | 0.009 | 0.4350 | 3.902 |
| 9,800 | 0.005 | 0.2300 | 1.091 |
| 11,000 | 0.005 | 0.2600 | 1.394 |
| 11,000 | 0.006 | 0.3040 | 1.905 |
| 19,000 | 0.030 | 1.4600 | 43.951 |
| 20,000 | 0.008 | 0.4000 | 3.299 |
| 24,000 | 0.032 | 1.5600 | 50.177 |
| 24,500 | 0.017 | 0.8200 | 13.864 |
| 30,000 | 0.012 | 0.5800 | 6.936 |
| 35,600 | 0.039 | 1.9000 | 74.433 |
| 36,500 | 0.025 | 1.23 | 31.194 |
| 38,000 | 0.039 | 1.9000 | 74.433 |
| 40,000 | 0.016 | 0.7900 | 12.868 |
| 50,000 | 0.025 | 1.2000 | 29.691 |
| 53,000 | 0.023 | 1.1000 | 24.948 |
| 60,000 | 0.029 | 1.4000 | 40.412 |
| 69,000 | 0.044 | 2.1500 | 95.309 |
| 70,000 | 0.038 | 1.8200 | 68.297 |
| 82,000 | 0.056 | 2.7300 | 153.668 |
| 88,000 | 0.080 | 3.8700 | 308.802 |
| 90,000 | 0.062 | 3.0000 | 185.567 |
| 91,000 | 0.085 | 4.1000 | 346.598 |
| 91,000 | 0.092 | 4.4600 | 410.136 |
| 92,000 | 0.062 | 3.0000 | 185.567 |
| 93,300 | 0.059 | 2.8700 | 169.833 |

FIG. 1B

PRECISION TRACKING DEVICES, SYSTEMS, AND METHODS

CLAIM OF PRIORITY

The present application is a continuation-in-part of and claims priority to U.S. patent application Ser. No. 18/384,466, entitled "Intermittent power supercapacitor tracking system" and filed Oct. 27, 2023, which is a continuation-in-part of U.S. patent application Ser. No. 17/468,326, entitled "Monitoring systems for shipping containers" and filed Sep. 7, 2021, which is a continuation of U.S. patent application Ser. No. 16/231,223, entitled "Machine and method for generating electrical power from the motion of a moving towed transport platform" and filed Dec. 21, 2018, all of which are assigned to the assignee hereof and hereby expressly incorporated by reference in their entirety.

FEDERALLY SPONSORED RESEARCH

Not applicable to this application.

SEQUENCE LISTING OR PROGRAM

Not applicable to this application.

BACKGROUND OF THE INVENTION

Prior Art

Interested parties seek to utilize s to track unpowered s such as trailers and. Numerous such s exist, such as the Orbcomm GT-1100, which offers monitoring hardware and services for trailers. These services may include GPS tracking, detecting the connection and disconnection of a trailer to and from a, respectively, the loading and unloading of an onto and from a, respectively, and the opening and closing of doors, motion start/stop detection, heartbeat reporting, and cellular network jamming detection. Communications between a and a server are implemented using cellular or combined satellite-cellular communications. The GT-1100 may incorporate a 3-axis accelerometer, four 16-bit A/D converters, one CAN bus interface, four GPIOs, one RS-232 serial interface, one RS-485 serial interface, and/or one USB interface. Power for the GT-1100 is provided by a solar panel and rechargeable battery, wherein the solar panel recharges the battery when exposed to adequate sunlight. The solar panel, battery, and electronics are all incorporated into a single physical unit.

On solar-powered s, such as the GT-1100, the solar panel or solar panels must receive enough sunlight, whether direct or indirect, to charge the unit's battery. On a standard dry-van trailer, where the rectangular structure enclosing the cargo is a part of the trailer, a solar-powered may be installed on the top of the trailer enclosure where it is elevated, has a clear view of the sky and is exposed to direct sunlight during sunny days under most circumstances. In this configuration, a GT-1100 may generate sufficient power to charge the battery adequately for operation.

However, this configuration does not work well on. Chassis are specialized trailers designed to carry s, which are typically loaded onto and then detached from a given for a single trip, after which another is loaded for the next trip, and so on. Mounting a solar-powered on top of an is not a viable solution for monitoring a particular since the loaded does not remain constant. The owners and renters of often seek to monitor their rather than the loaded s.

On many, the or containers loaded onto them cover most or all of the top of the. Thus, if a solar-powered is mounted on a facing the sky, the sky is completely obscured when an is loaded onto it. On some the entire frame of the is covered by a loaded and there is no place to mount a solar-powered on the frame that has an unobscured view of the sky when an is loaded. On other, the only horizontal portion that may not be completely covered by a loaded is in the front area where the is hitched to the that tows it. The view of the sky in this area is highly obscured by the loaded in the rear and the towing cab in the front. After empirical testing, a leasing company could find no mounting location on multiple for a GT-1100 solar-powered that resulted in monitoring reliable enough to resell to their customers.

Two other problems are misuse and theft. A skyward-facing solar-powered mounted on a is easily spotted by a person on the ground. Sometimes, a driver towing a may wish to make an unauthorized stop or take an unauthorized route, or thieves may wish to steal the, possibly with its cargo. If a is easily spotted then a driver or thief may remove it to obscure the misuse or theft of the. Empirical testing by a leasing company over a two year period has demonstrated that a GT-1100 mounted in non-obvious locations within a frame does not generate enough power for reliable operation.

A scientific analysis of solar power generation may shed some light on this problem. Light illuminance is measured in lux in SI units of lm/m^2 and in foot-candles in SAE units of lm/ft^2. From the Wikipedia page on lux: "The lux is one lumen per square [meter] (lm/m^2), and the corresponding radiometric unit, which measures irradiance, is the watt per square [meter] (W/m^2). There is no single conversion factor between lx and W/m^2; there is a different conversion factor for every wavelength, and it is not possible to make a conversion unless one knows the spectral composition of the light" Since a given solar panel has a fixed area, the power (in watts) contained in daylight striking a solar panel is directly proportional to its illuminance in lux.

According to "Recommended Light Levels (Illuminance) for Outdoor and Indoor Venues," a document published by the National Optical Astronomy Observatory, the illuminances for different outdoor lighting conditions are as follows:

| | Illumination | | |
|---|---|---|---|
| Condition | [foot-candles] | [lux] | [lux ](rounded) |
| Sunlight | 10,000 | 107,527 | ~100,000 |
| Full Daylight | 1,000 | 10,752 | ~10,000 |
| Overcast Day | 100 | 1,075 | ~1,000 |
| Very Dark Day | 10 | 107 | ~100 |
| Twilight | 1 | 10.8 | ~10 |
| Deep Twilight | 0.1 | 1.08 | ~1 |
| Full Moon | 0.01 | 0.108 | ~0.1 |
| Quarter Moon | 0.001 | 0.0108 | ~0.01 |
| Starlight | 0.0001 | 0.0011 | ~0.001 |
| Overcast Night | 0.00001 | 0.0001 | ~0.0001 |

The "[lux](rounded)" values were added in order to simplify this analysis. According to these guidelines, a GT-1100 mounted on the inside of a frame might receive between 1,000 lux and 10,000 lux on a sunny day whereas one mounted on the top of a dry-van trailer should receive between 10,000 lux and 100,000 lux. Clearly, a solar panel mounted with an unobscured view of the sky will receive more power than one not in direct daylight.

The following experiment was performed to directly measure the power generated by a solar panel in varying illuminances. The light sensor for a lux meter (model: Dr. meter LX1010B Digital Illuminance/Light Meter, 0-100,000 Lux Luxmeter) was affixed to the flat surface of a ruler and a solar panel (model: Seeed Studio 313070004 0.5 W 55 mm×70 mm) was affixed adjacent to it on the ruler and facing in the same direction, such that the light received by each unit was virtually the same as that received by the other. The solar panel electrical leads were connected to either end of a 48.5Ω resistor. A series of 59 lux meter and voltage readings across the resistor was made in varying light conditions. The current and power generated in each reading were calculated using Ohm's law (I=V/R) and the power equation (P=I^2×R=V×I), respectively. The full data set is shown in FIG. 1. A summary of the results is as follows:

| | Power Generated [mW] | | | |
|---|---|---|---|---|
| Illuminance Range [lux] | Min | Max | Average | Approximate Condition |
| 32-95 | 0.006 | 0.036 | 0.021 | low light (indoors) |
| 220-990 | 0.069 | 2.245 | 0.839 | low light (indoors) |
| 1,000-9,800 | 0.022 | 5.155 | 1.720 | outdoors in shadow |
| 11,000-24,500 | 1.091 | 50.18 | 16.53 | full daylight with view |
| 30,000-93,300 | 6.936 | 410.1 | 130.5 | of direct sunlight |

This experiment demonstrates that this solar panel generates nearly ten times as much power from full daylight as from in shadow and about 70 times as much power from direct sunlight as from in shadow. The power generated by this solar panel varies roughly linearly with the logarithm of the illuminance. If this solar panel were mounted within a frame with an on top, it would likely receive illuminance in the 1,000 lux to 10,000 lux range during daylight, providing between 1.4% and 10% of the power it would generate if mounted with an unobstructed view of the sky. This experiment suggests that the reason the GT-1100 was not able to provide adequate monitoring services when mounted on is that its solar panel could not receive enough light to produce adequate.

There are several methods for connecting a 's electrical system to a trailer or, including four-, five, six, and seven plug adapters. Typically, these plugs complete several circuits including the trailer or brake lights and running lights. The brake light circuit only receives power when the brakes are applied and the running lights only receive power when the running lights are turned on in the. During an informal survey of chassis being towed on U.S. Interstate 880 near the Port of Oakland, California during daylight hours, numerous chassis were observed with no taillights illuminated. Many of these connector systems include an auxiliary power connector, but operators may not power this in order to prevent the battery from being run down by connected trailer equipment. Companies that lease trailers or to trucking companies no control over whether or not the running lights are powered in daytime and no control over whether or not the auxiliary power connector is powered. It appears that there is not a reliable power source that is always available to a from the to which it is hitched, even when it is running. A survey of trailer tracking devices from vendors Orbcomm, Blackberry, Spireon, Zonar, and SkyBitz shows that none of these vendors' tracking devices relies exclusively on power provided by the, which suggests that the market has decided that this is not a reliable source of power.

A party interested in monitoring a is likely more interested in continuously monitoring its position when in motion than when it is stationary. Solar-charged batteries, including those on the GT-1100, are capable of waking up periodically and reporting their position. However, they do not provide adequate power for continuous monitoring. The advertised reporting frequencies of solar-battery s typically range from once every five minutes to once per day.

BRIEF SUMMARY OF THE INVENTION

One solution to the problem of powering electronics such as s on a when in motion is to harvest the kinetic energy intrinsic to the motion. The are two major sources of energy available when a is in motion: airflow and wheel rotation. Lesser sources of energy include the periodic motions from vibration and swaying when in motion. One way to convert airflow and wheel rotation into is via a. A converts kinetic mechanical energy into.

A in motion experiences airflow in nearly all conditions. One way to harness airflow energy is for the airflow to turn a that drives an. In one embodiment, a is "a mill or machine operated by the wind usually acting on oblique vanes or sails that radiate from a horizontal shaft."

An experiment was performed to quantify the generated by airflow turning a and driving an. A DC electric motor may be used as an by turning its shaft to generate. A propeller turning the shaft of a DC electric motor is an example of a turning and driving an. Using a hobby kit containing four propellers (s) and three DC electric motors (generators), a "Delinx Homemade DIY Project Kits: DC Motors, Gears, propellers, AA Battery case, Cables, on/Off Switch, 9V Battery Clip", an apparatus was build to test how much was generated by multiple/generator combinations at different airspeeds. Each combination of one of four s and one of three generators was tested wherein one was mounted on the shaft of one generator. For each/generator combination, the electrical leads of the generator were connected to either end of a 23.7Ω resistor's leads. A voltmeter was also connected across the resistor to measure the voltage produced at each airspeed. Using Ohm's law (I=V/R) and the power equation (P=I^2×R=V×I), the current and power generated, respectively, were calculated. The apparatus was held out the open window of an automobile driving on a street and the voltages recorded at 20 MPH, 30 MPH, and 40 MPH. The experiment was performed in both the North and South directions on the same street to provide some compensation for prevailing wind bias. The that produced the most power in this experiment measured less than 2 inches in diameter. The results for the/generator combination that produced the highest follow:

| Speed [MPH] | Bearing | Voltage [V] | Current [A] | Power [W] |
|---|---|---|---|---|
| 20 | South | 3.6 | 0.152 | 0.547 |
| 20 | North | 4.5 | 0.190 | 0.854 |
| 30 | South | 6.5 | 0.274 | 1.783 |
| 30 | North | 7.5 | 0.316 | 2.373 |

-continued

| Speed [MPH] | Bearing | Voltage [V] | Current [A] | Power [W] |
|---|---|---|---|---|
| 40 | South | 10.0 | 0.422 | 4.219 |
| 40 | North | 10.0 | 0.422 | 4.219 |

Creating a linear regression model of this data yields the linear equation: Power=0.175925×Speed−2.94525 watts. According to this equation, this/generator combination produces 1 watt of at 22.43 MPH and 0.85 watts of at 21.57 MPH.

At highway speeds, the apparatus tested provides at an order of magnitude sufficient to power a microprocessor-based. For example, the Raspberry Pi Zero W is a microprocessor-based computer that consumes 0.5 W when idle. Empirical testing has shown that a Raspberry Pi Zero W connected to a USB GPS module, the "Diymall Vk-172 vk 172 Gmouse G-mouse Usb Gps Dongle Glonass Support Windows 10/8/7/vista/XP Raspberry PI B+3 Vehicle Aviation Tracker" and running software that logs GPS readings at 1 Hz consumes a continuous 0.85 W (170 mA at 5V).

Besides logging GPS data, a may need to transmit this data, a subset of it, or other data to a server on a periodic basis. One means for performing such transmissions is a cellular modem. An example of a cellular modem is the SIMCom SIM808. According to page 20 of a SIM808 specification, "SIM800_Hardware Design_V1.08", the SIM808 power requirement is as follows: "The power supply range of SIM800 is from 3.4V to 4.4V. Recommended voltage is 4.0V. The transmitting burst will cause voltage drop and the power supply must be able to provide sufficient current up to 2 A." Thus, the SIM808 requires a maximum of 2 A at 4.0V, or 8.0 W, to transmit. According to the linear equation above, the best/generator combination provides 8.85 W (8.0 W for continuous cellular modem transmission+0.85 W for continuous GPS logging) at 67.0 MPH. Two/generator combinations generating in parallel would generate 8.85 W at 33.5 MPH, three at 22.3 MPH, four at 16.8 MPH, etc. Thus, it is feasible to generate adequate power for continuous GPS logging and periodic cellular transmissions using one or more/generator combinations on a moving at speeds regularly experienced on roadways.

Empirical tests were performed where a Raspberry Pi 3 B+ was communicably coupled to a SIM808 cellular modem and successfully transmitted to a web server from which it retrieved the text of an HTML web page. The Raspberry Pi 3 B+ runs the same operating system and uses an identical electronic interface to the SIM808 as the Raspberry Pi Zero W, and the two are functionally identical for the purposes of this experiment. Testing showed that simple messages were transmitted within 10 seconds. Drawing 8.0 W for 10 seconds requires 80 J of energy. In the/generator experiment detailed above, the optimal/generator would generate 80 J of energy in 80 seconds at 22.43 MPH.

In order to provide continuous tracking and periodic transmissions when the available kinetic energy is inadequate, such as when a is in slow traffic, stopped at intersections, etc., the excess generated at higher speeds may be converted to potential energy and stored in an from which it can be converted back to when needed. Examples of s include batteries, capacitors, flywheels, and springs.

In one embodiment, the power generation system for such a includes one or more s driving one or more generators. In one embodiment, the power system for such a includes one or more energy storage devices such as one or more capacitors, flywheels, batteries, springs, or other energy storage devices, which store excess energy for use when the power generation system does not produce adequate power. This may be the case when the is moving at low speeds or when stationary.

BRIEF DESCRIPTION OF THE DRAWINGS

FIGS. 1A-1B are tables showing Lux, voltage, current and power readings in varying light conditions.

FIG. 7 shows the direction of a tractor platform coupling with and uncoupling from a chassis.

REFERENCE NUMERALS

Figure 2:
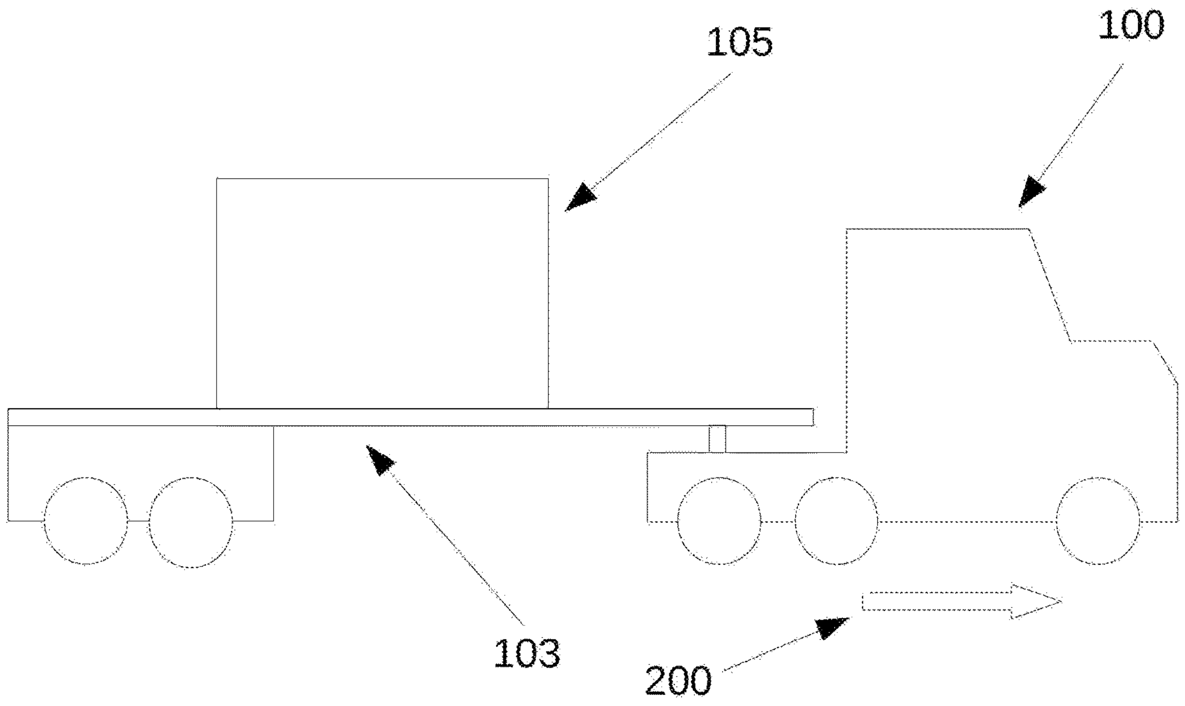
FIG. 2 shows a tractor platform towing a towed transport platform carrying a load. The right arrow shows the direction of towing.
Figure 3:
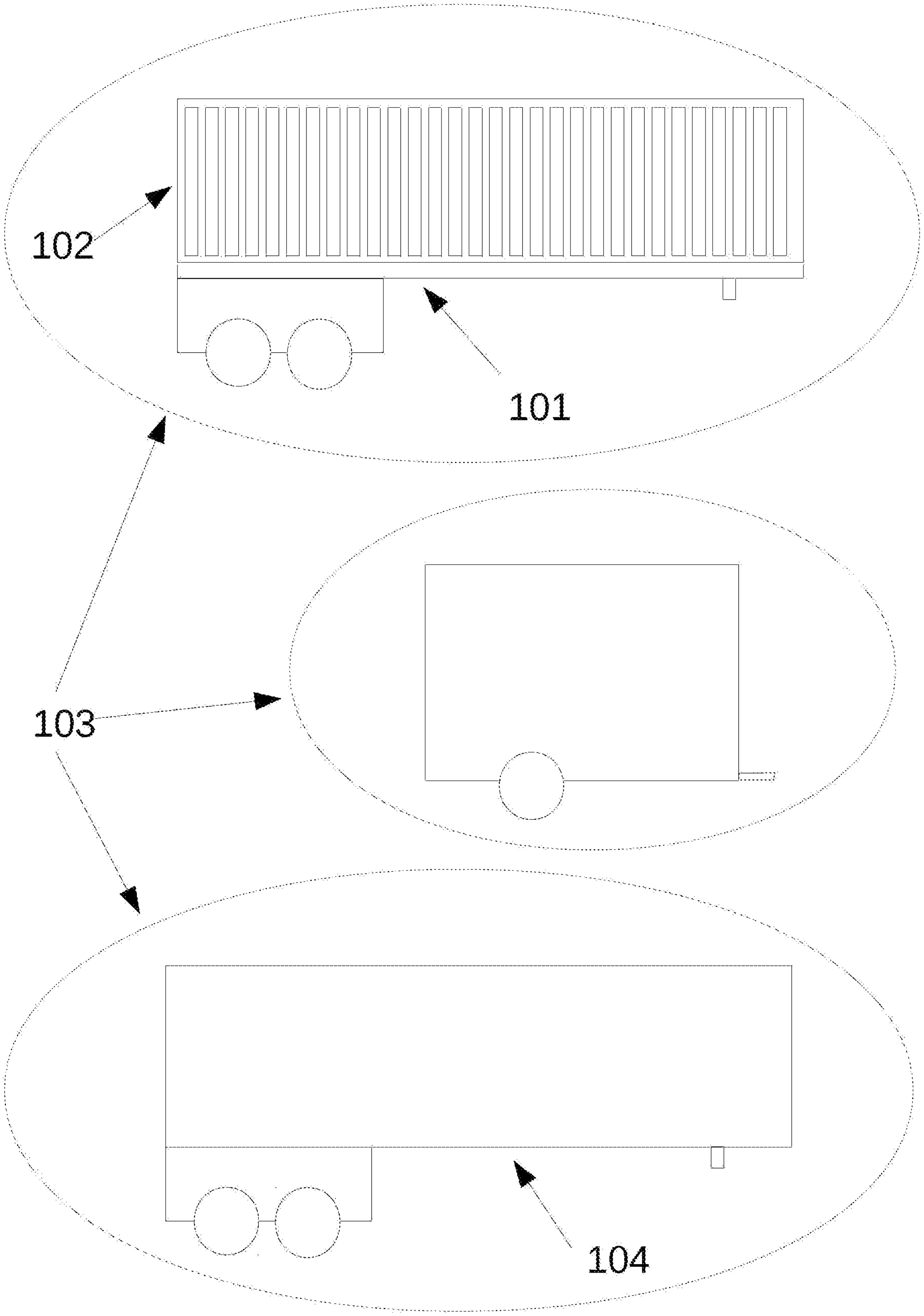
FIG. 3 shows three embodiments of a towed transport platform, including a chassis carrying an intermodal container, a car trailer, and a dry-van trailer.
Figure 4:
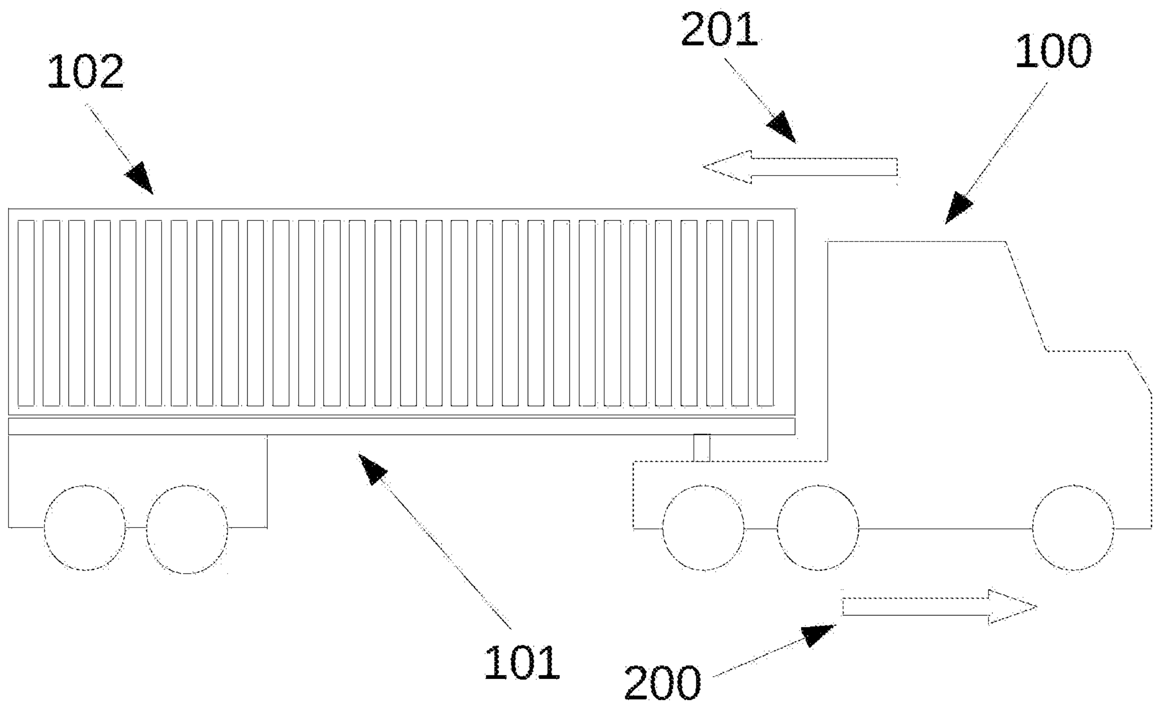
FIG. 4 shows a tractor platform towing a chassis carrying an intermodal container. The right arrow shows the direction of towing, and the left arrow shows the direction of the resulting airflow.
Figure 5:
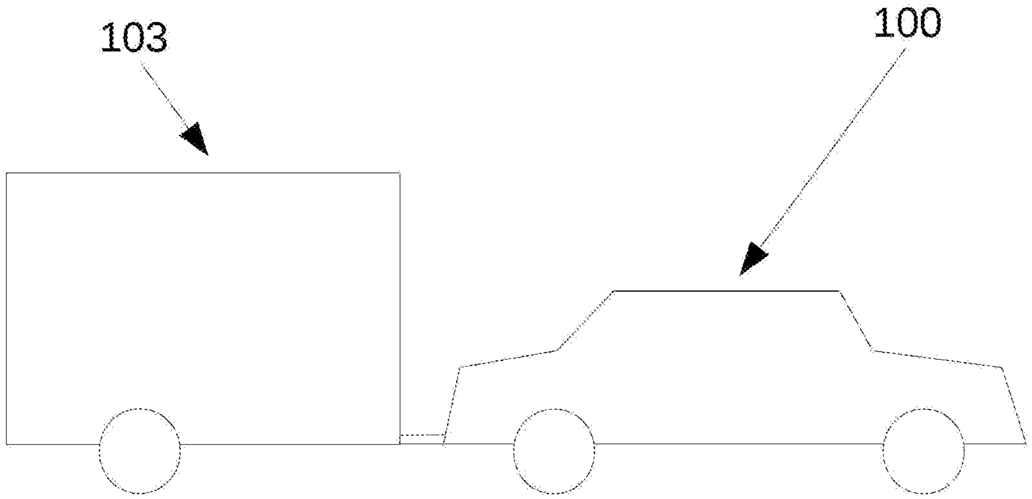
FIG. 5 shows a tractor platform towing a towed transport platform. Here, the tractor platform is an automobile, and the towed transport platform is a car trailer.
Figure 6:
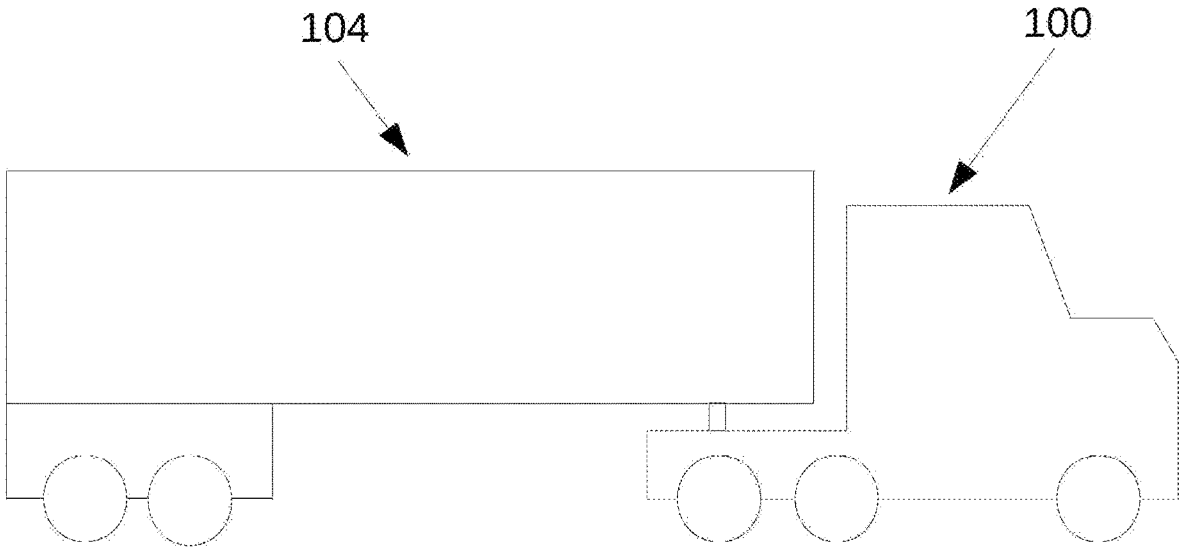
FIG. 6 shows a tractor platform towing a dry-van trailer, where the rectangular structure enclosing the cargo is an integral part of the trailer.
Figure 7:
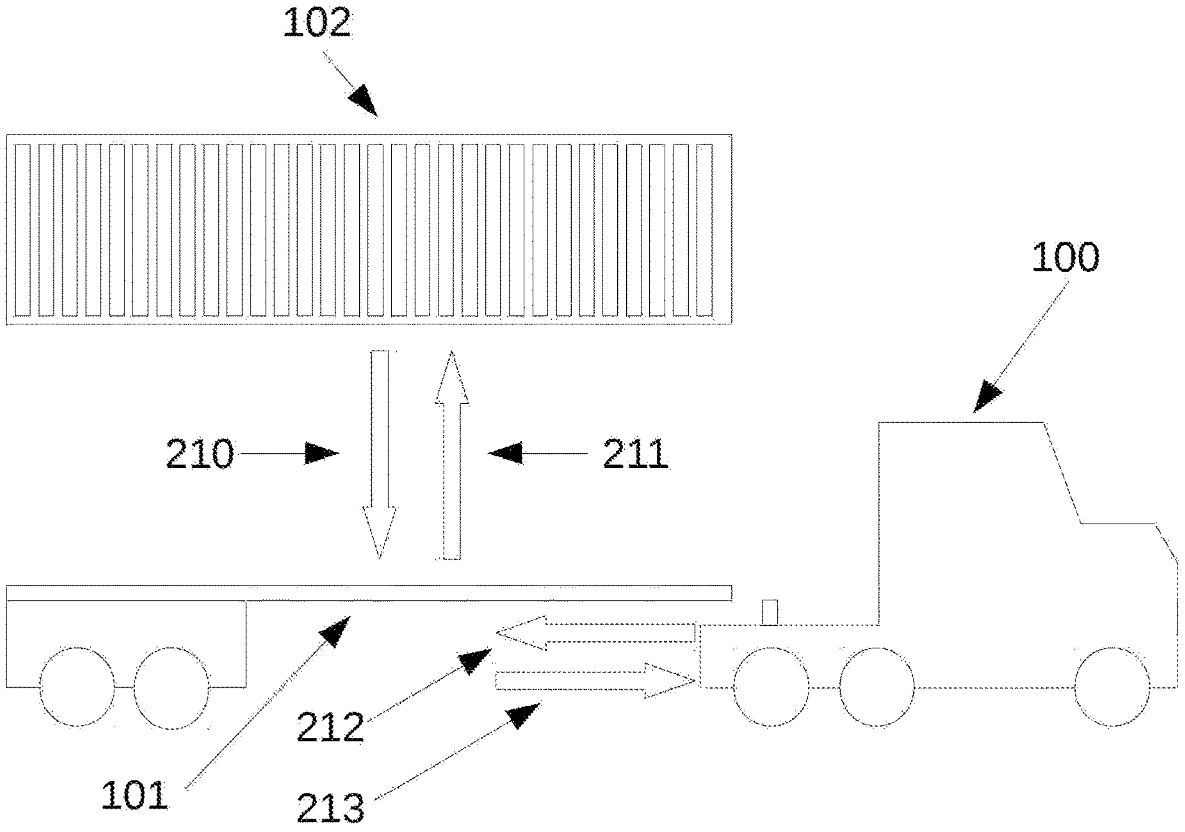
FIG. 7 shows the direction of loading an intermodal container onto a chassis and the direction of unloading an intermodal container off of a chassis. In addition.
Figure 8:
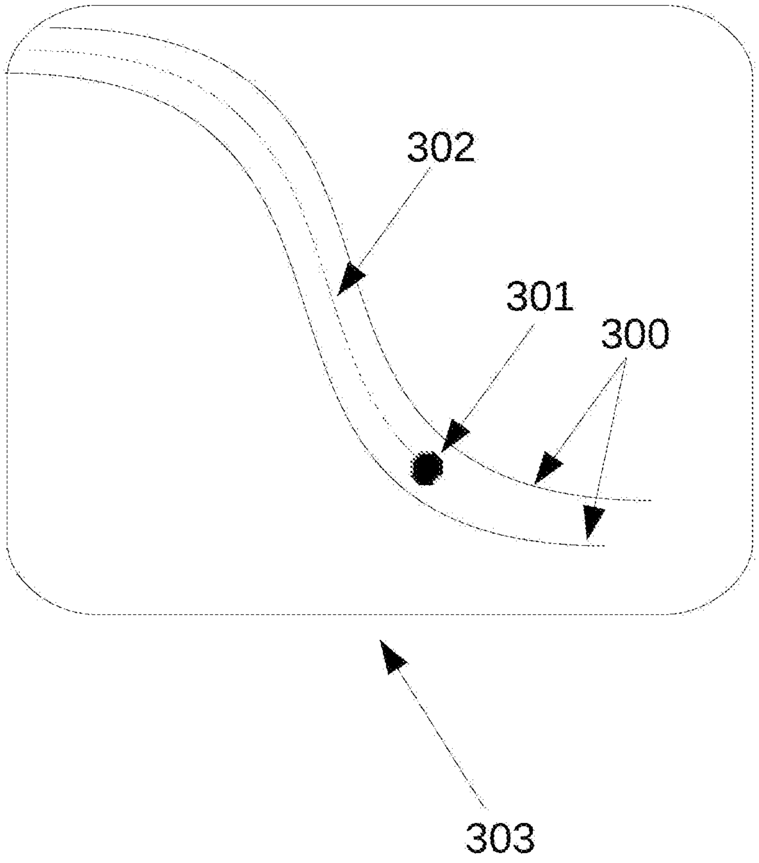
FIG. 8 shows a monitoring system view of the geolocation of a towed transport platform as it moves down a roadway, including the path taken. The view is framed within a user interface display.
Figure 9:
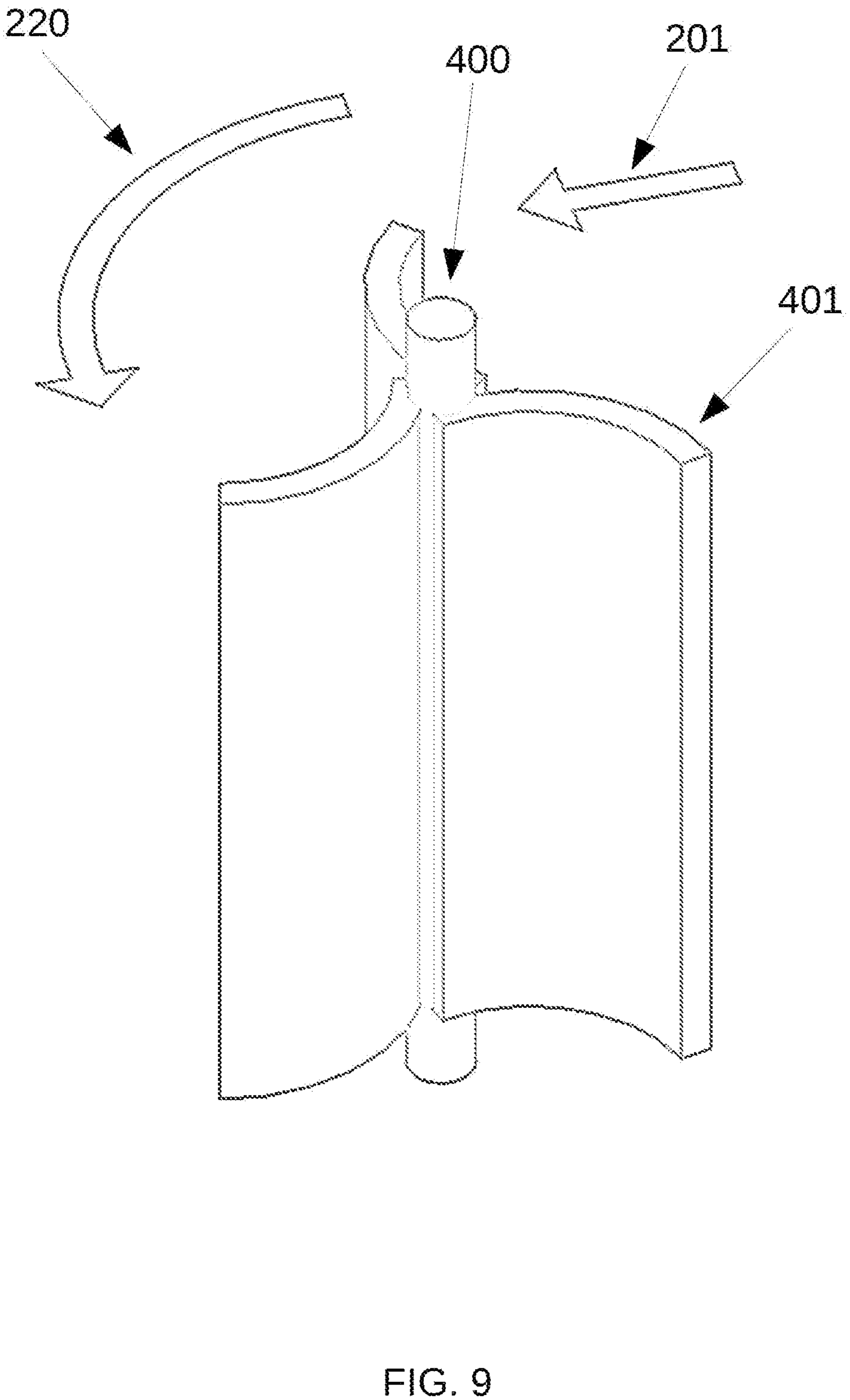
FIG. 9 shows a turbine mounted on a shaft that is rotating due to airflow. The direction of the airflow and the turbine's rotation are shown. A turbine whose axis of rotation is oriented substantially perpendicular to the direction of motion of airflow is known as a cross-flow turbine.
Figure 10:
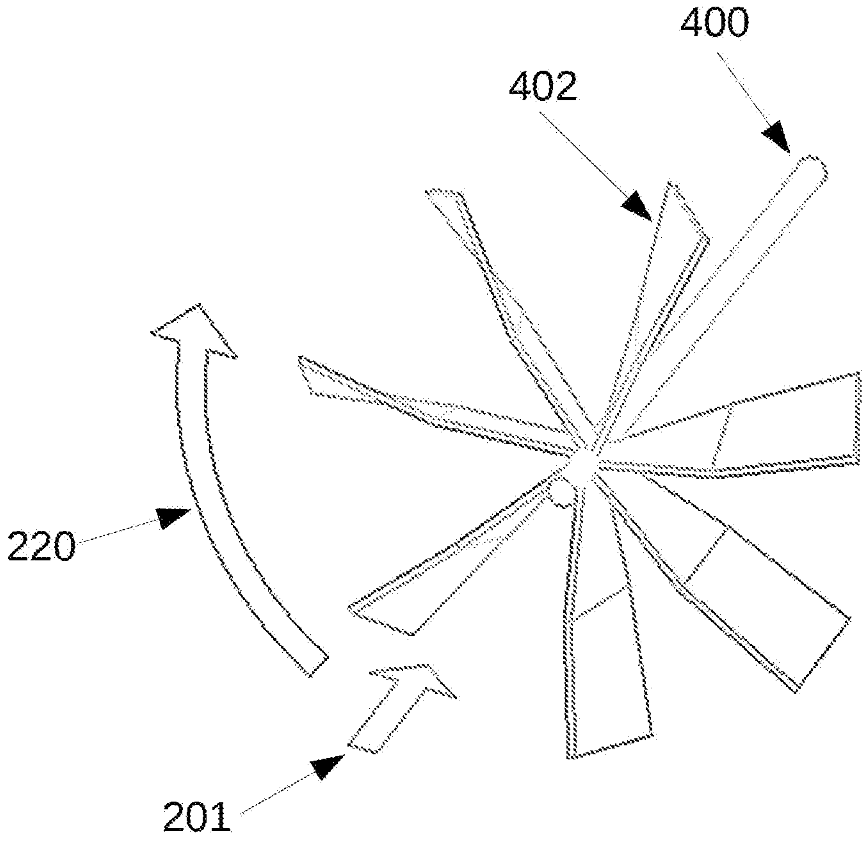
FIG. 10 shows a turbine mounted on a shaft that is rotating due to airflow. The direction of the airflow and the turbine's rotation are shown. A turbine whose axis of rotation is oriented substantially parallel to the direction of motion of airflow is known as an axial turbine.
Figure 11:
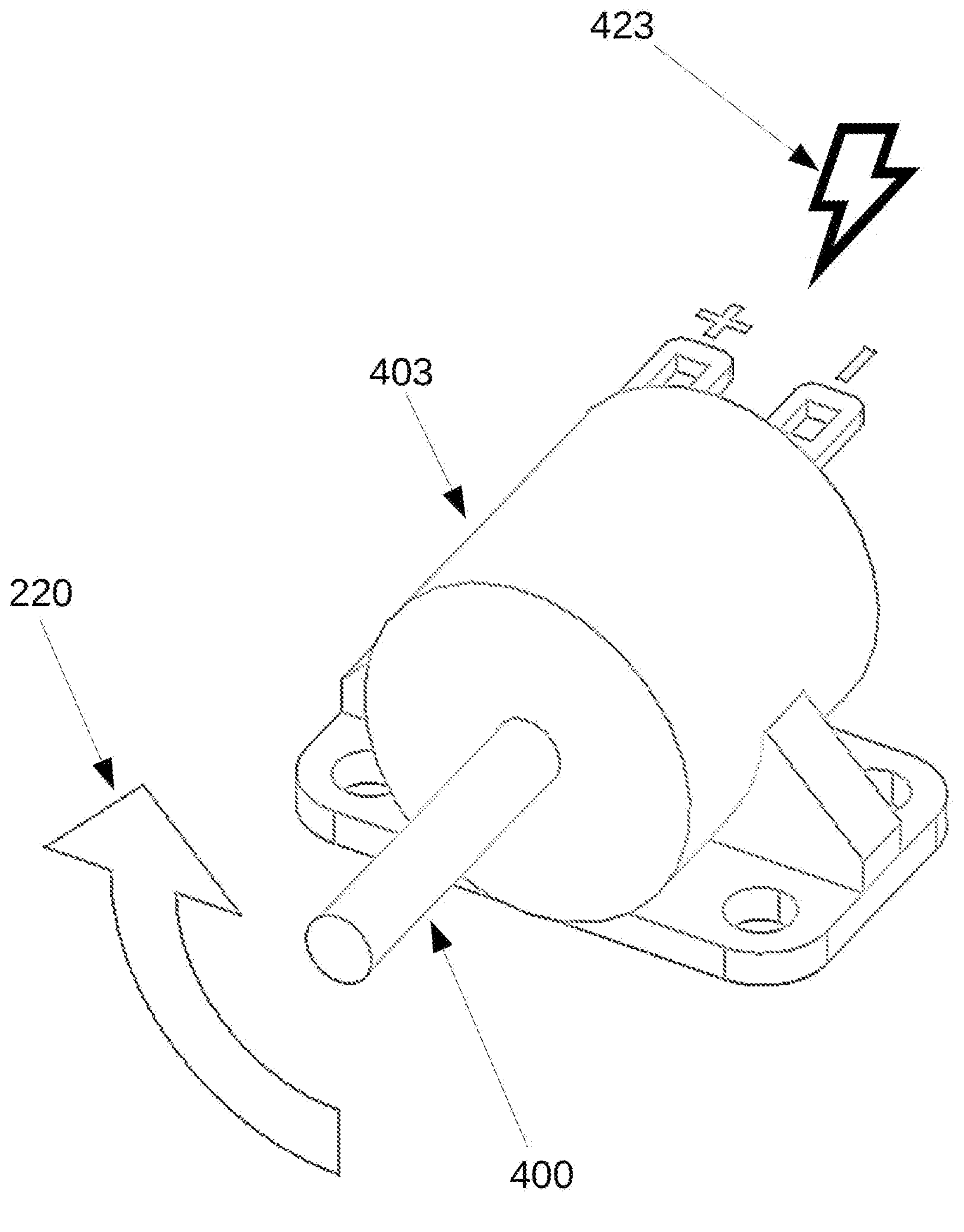
FIG. 11 shows an electric generator and its shaft, with a rotation direction shown. The electric generator generates electrical power when its shaft rotates.
Figure 12:
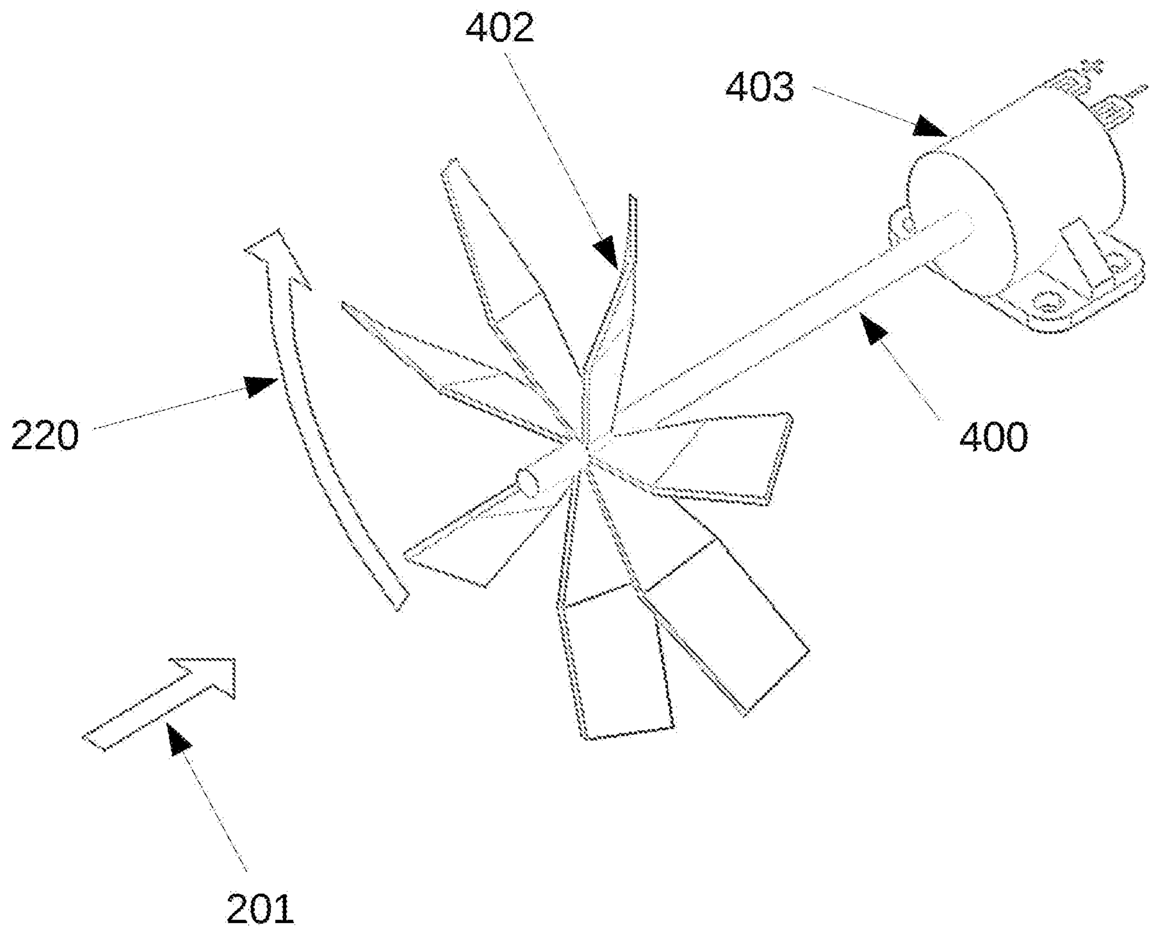
FIG. 12 shows a turbine physically coupled to a shaft that is physically coupled to an electric generator. The airflow causes the turbine and shaft to rotate, which causes the electric generator to generate electrical power.
Figure 13:
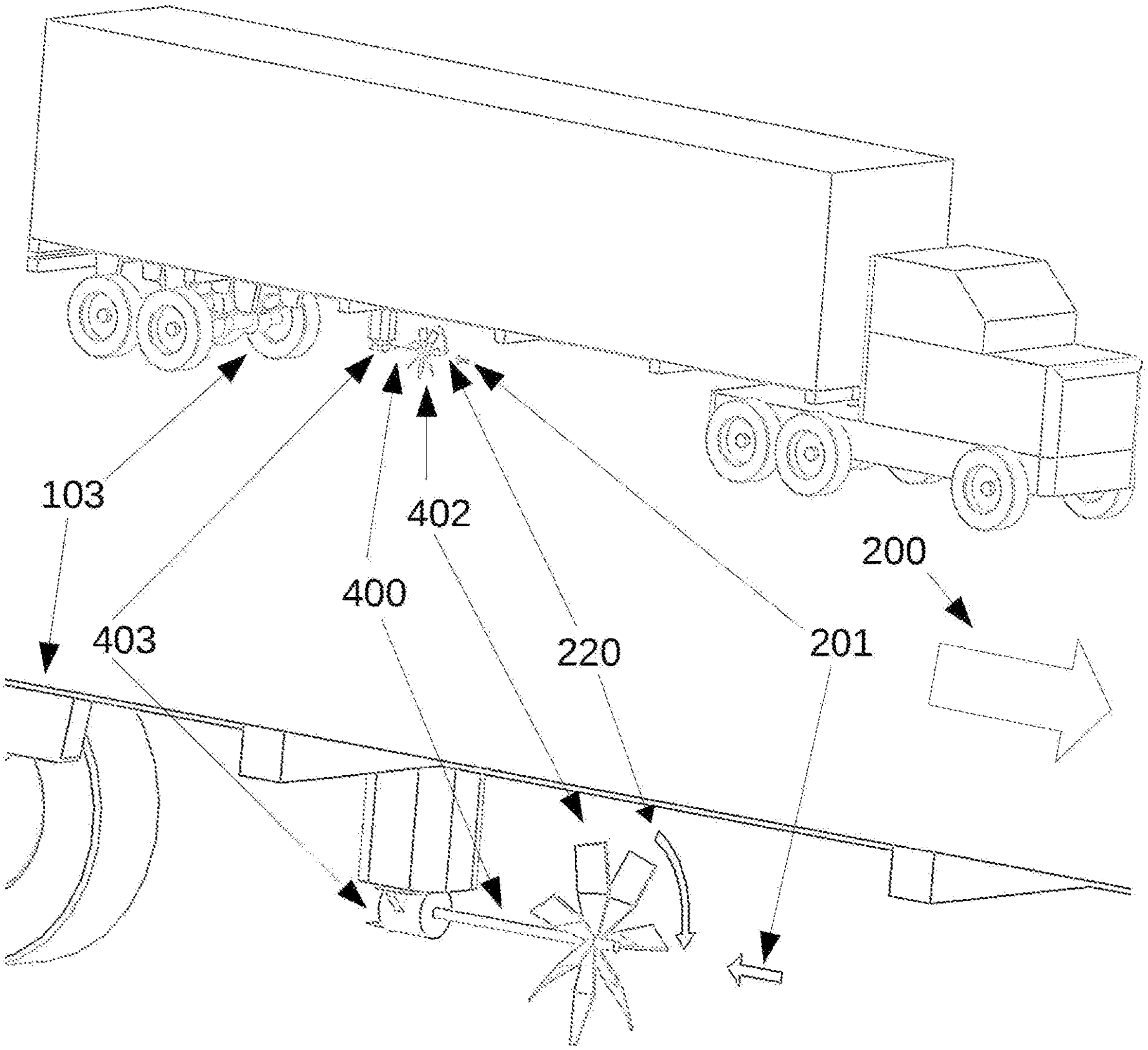
FIG. 13 shows a turbine, shaft, and electric generator physically coupled to a towed transport platform. The lower portion of the figure is a magnified view of the turbine assembly in the upper portion. The airflow resulting from forward motion causes the turbine and shaft to rotate, which causes the electric generator to generate electrical power.
Figure 14:
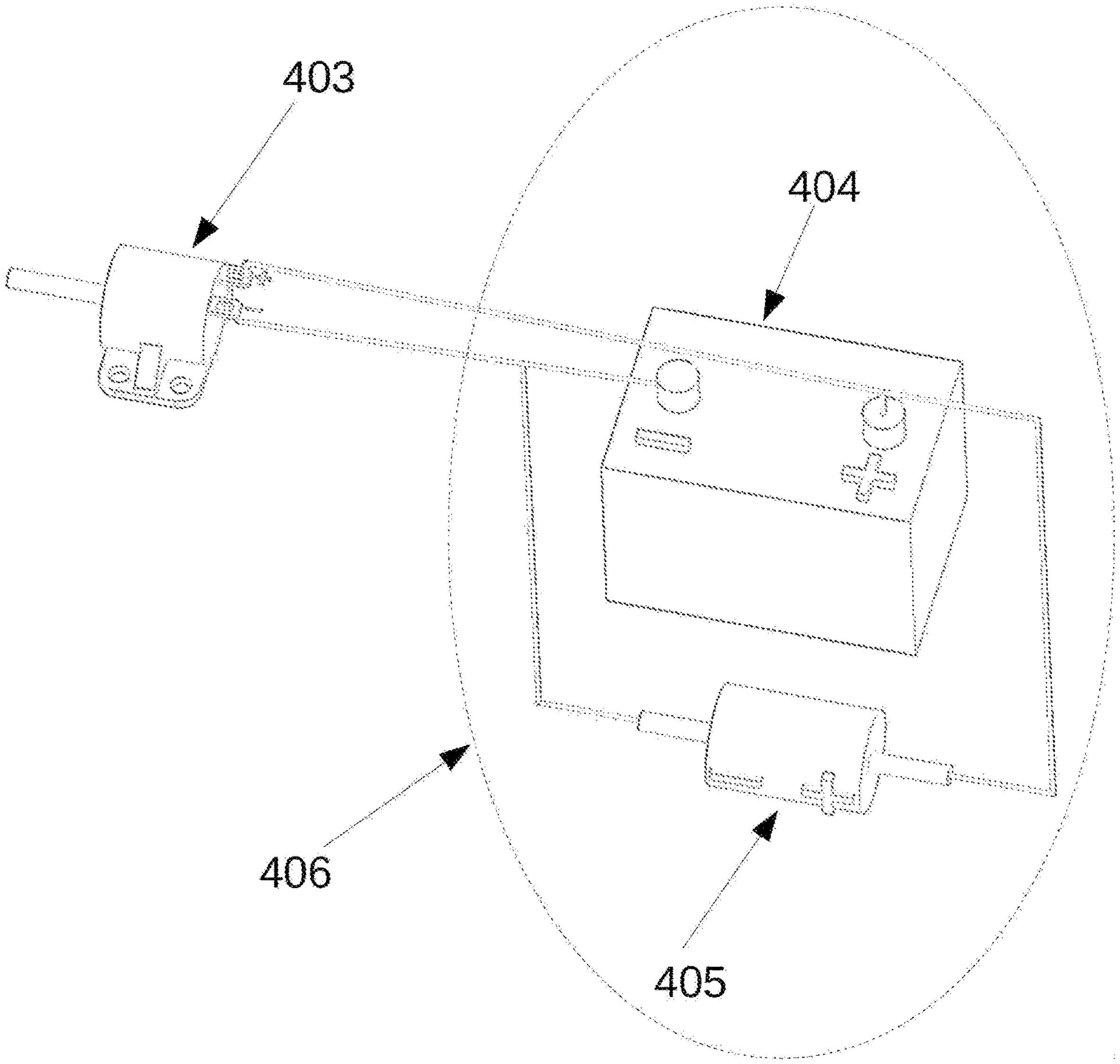
FIG. 14 shows an electric generator electrically coupled to both a battery and a capacitor. Both a battery and a capacitor are embodiments of an electrical energy storage device.
Figure 15:
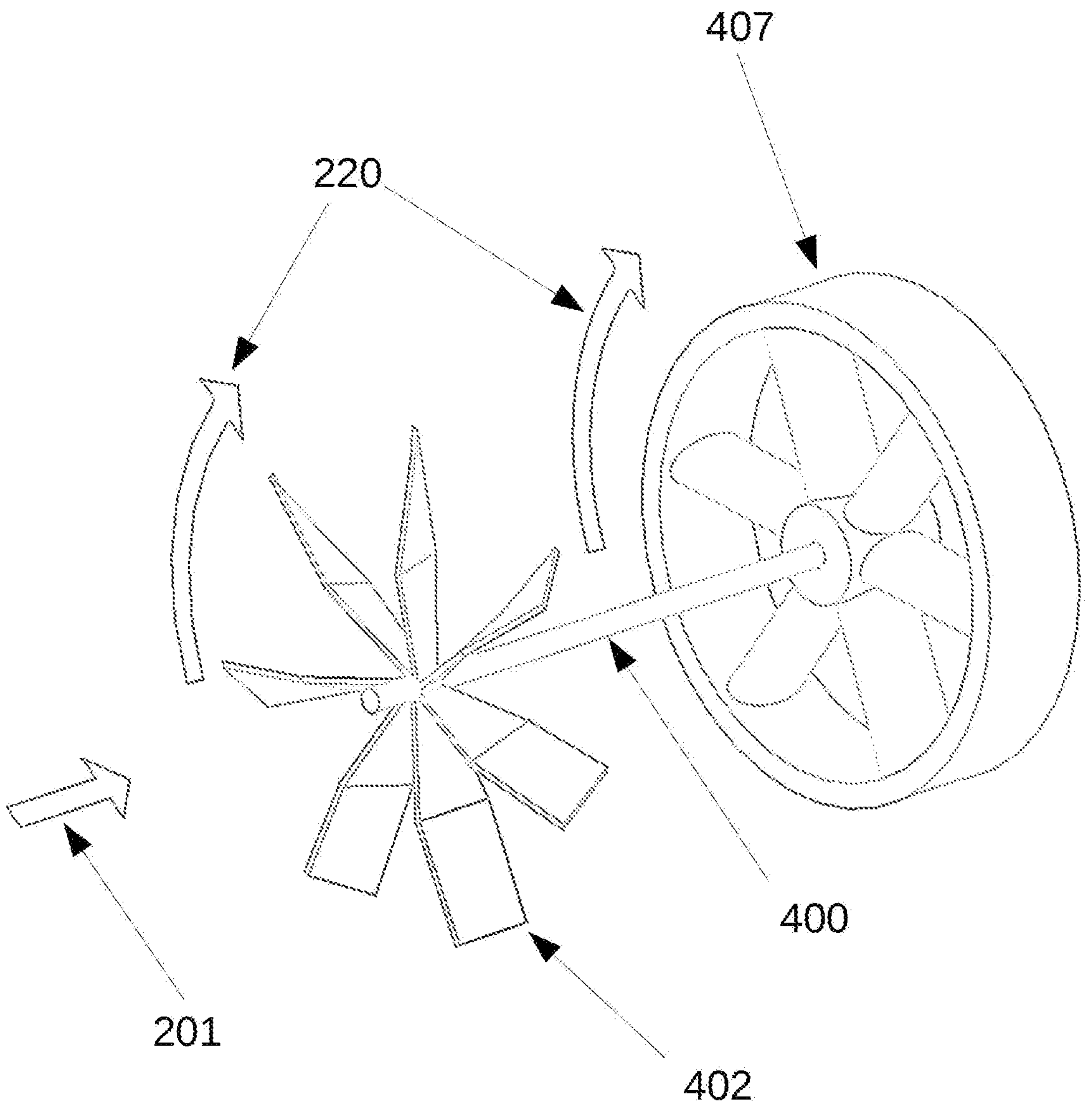
FIG. 15 shows a turbine physically coupled to a flywheel by means of a shaft. Oncoming airflow causes the turbine and, thus, the flywheel to rotate, as shown by the rotation. The rotation of the flywheel stores rotational mechanical energy.
Figure 16:
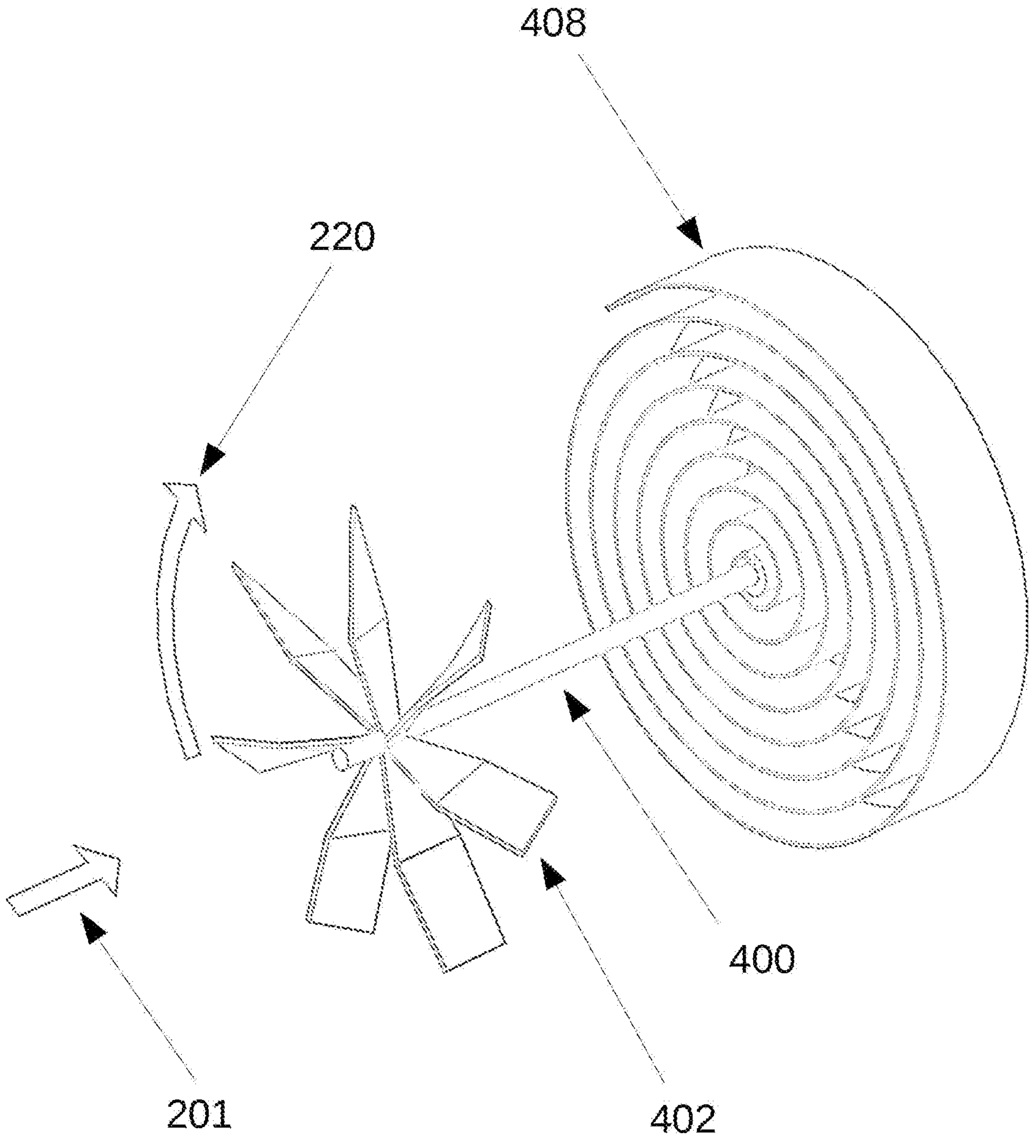
FIG. 16 shows a turbine physically coupled to a spring by means of a shaft. Oncoming airflow causes the turbine and, thus, the spring to rotate, as shown by the rotation. The rotation of the spring compresses it, which stores rotational mechanical energy.
Figure 17:
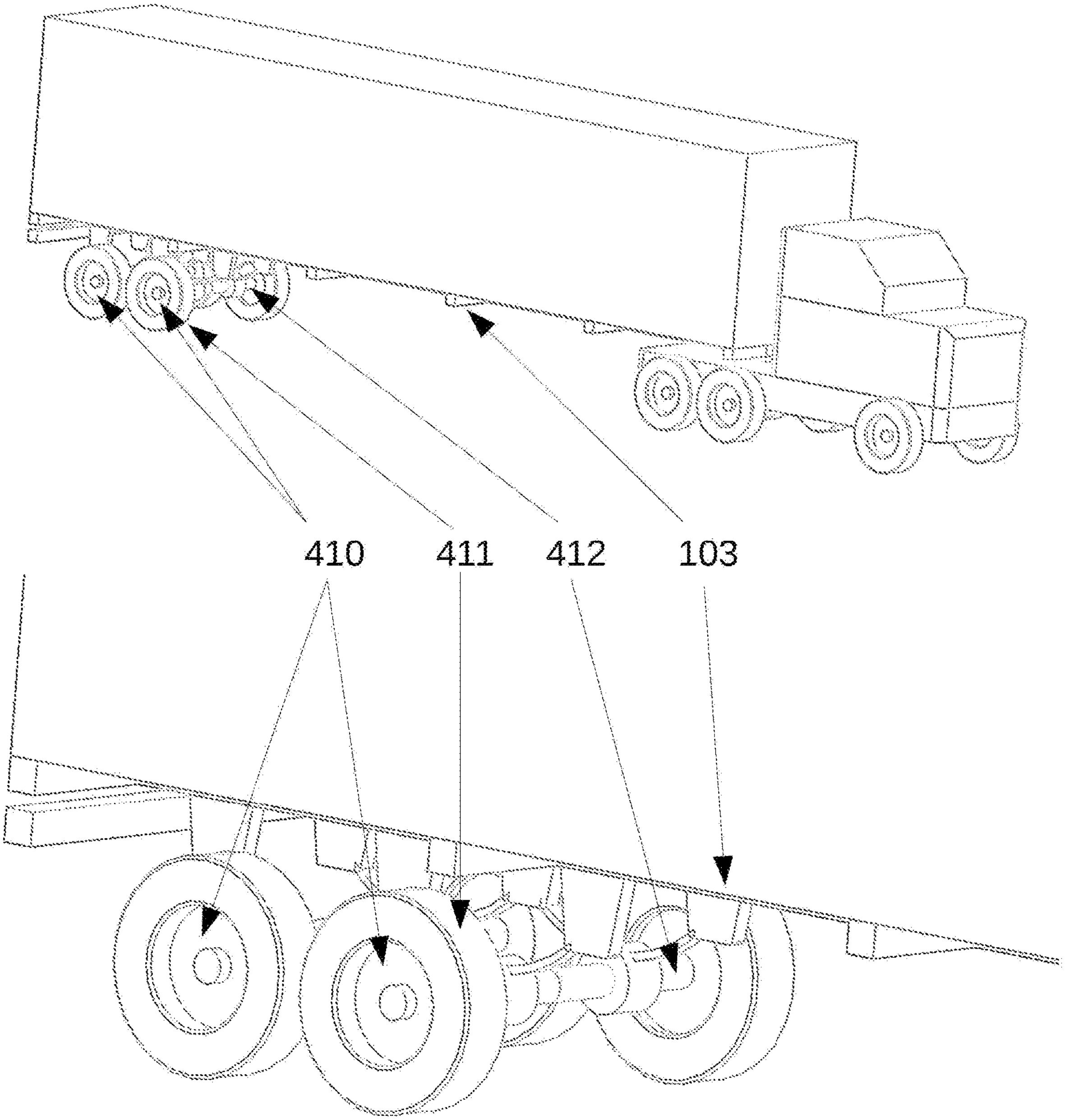
FIG. 17 shows wheels, tires, and axles on a towed transport platform.
Figure 18:
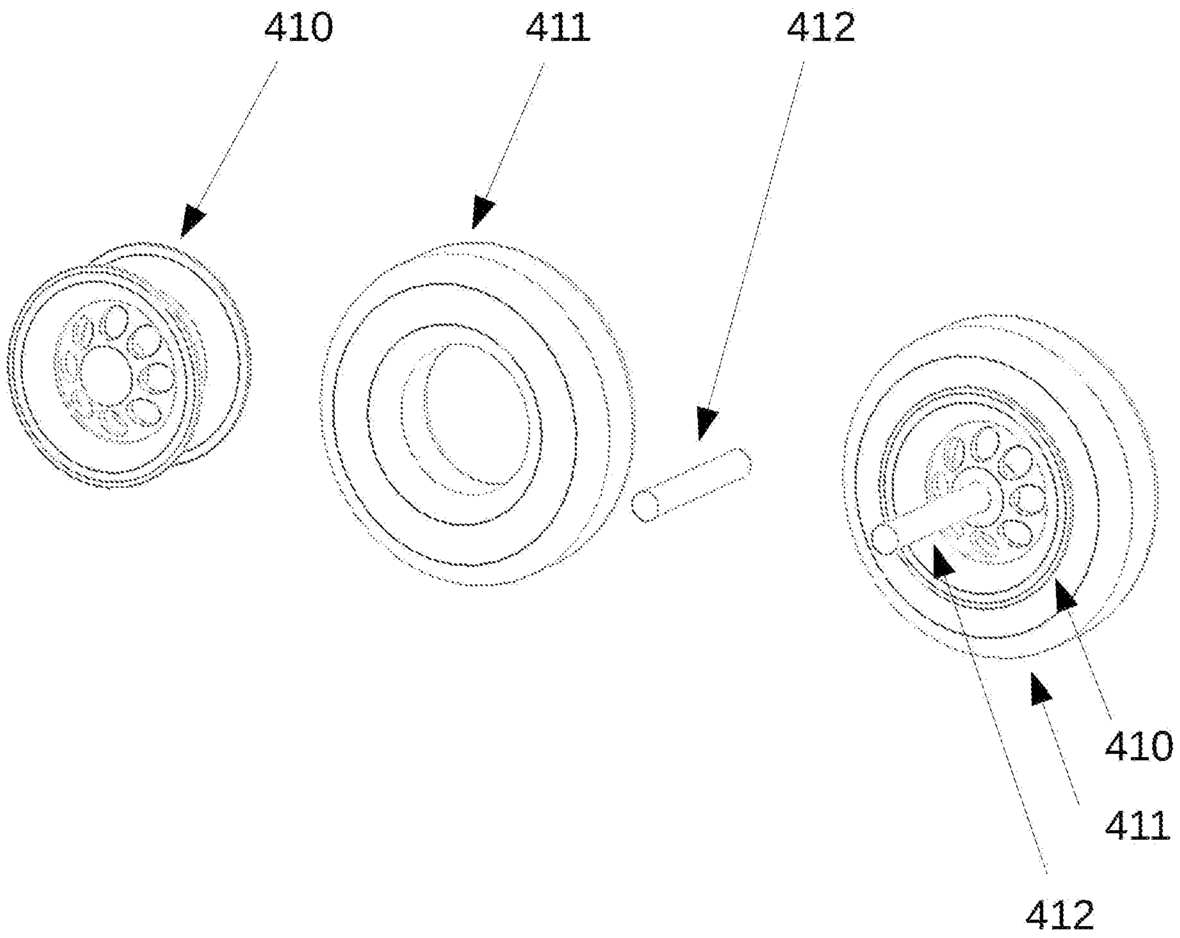
FIG. 18 shows a wheel, a tire, and an axle, as well as all three assembled.
Figure 19:
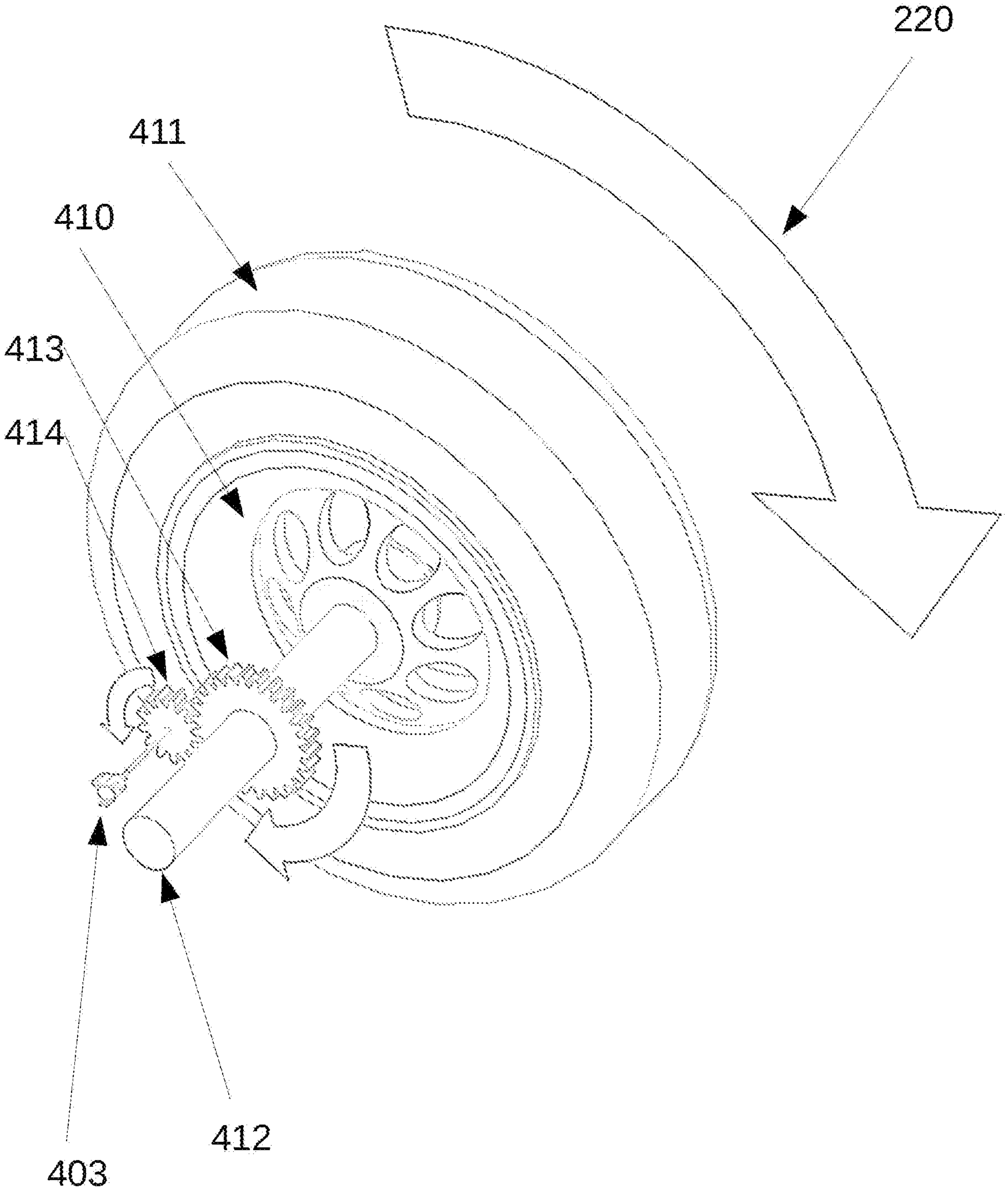
FIG. 19 shows a wheel, tire, and axle assembly physically coupled to a gearing, comprising a large gear and a small gear, which is physically coupled to an electric generator. The direction of wheel rotation is shown.
Figure 20:
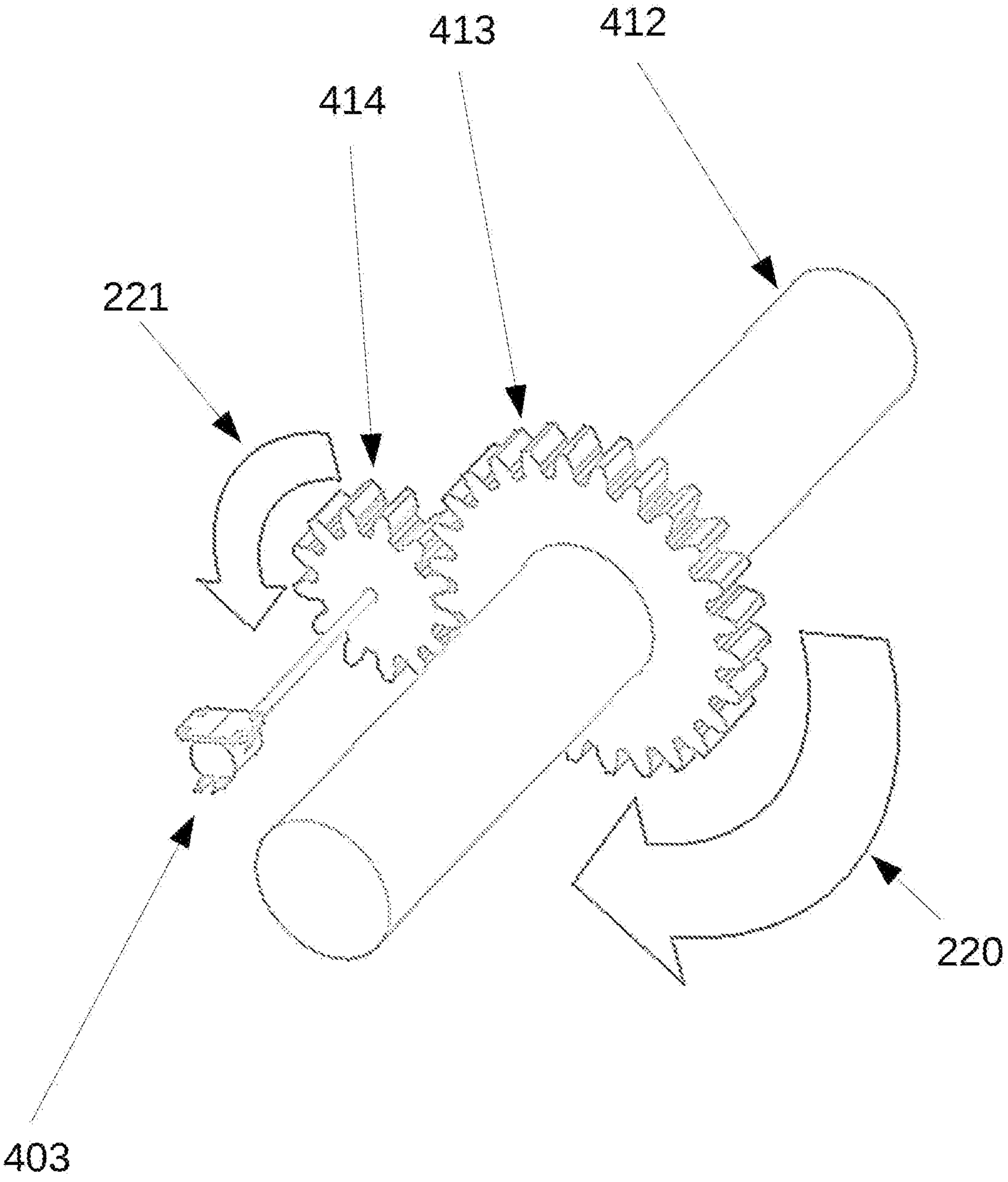
FIG. 20 is a close up of FIG. 19 without a wheel and tire, showing an axle physically coupled to a gearing, comprising a large gear and a small gear, which is physically coupled to an electric generator. The direction of the axle and large gear rotation and the direction of the small gear rotation are shown. The rotation of the axle rotates the gearing, which causes the electric generator to generate electrical power.
Figure 21:
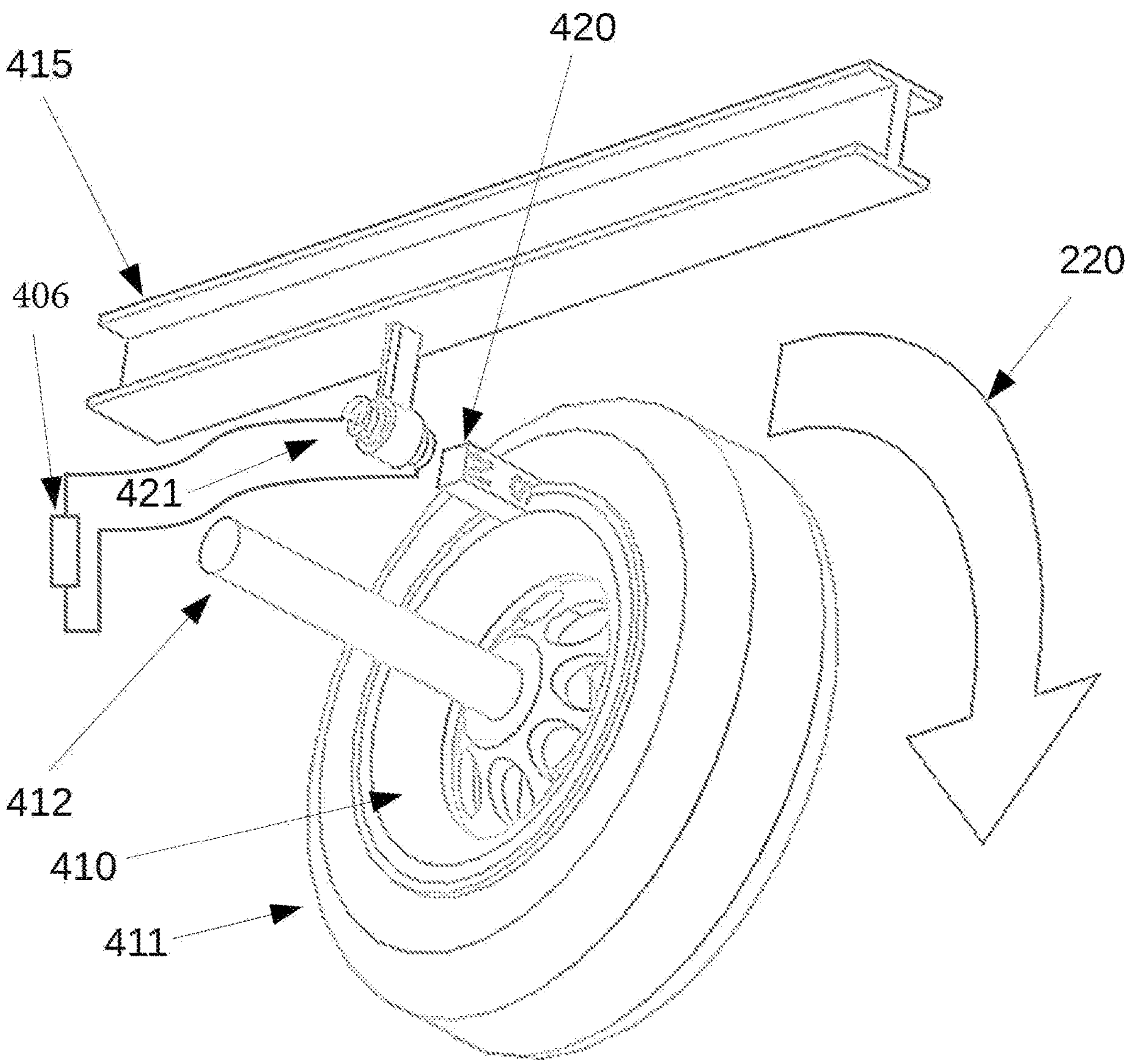
FIG. 21 shows a magnet physically coupled to a wheel, tire, and axle assembly, and an inductor physically coupled to a towed transport platform frame. The direction of wheel rotation is shown. The magnet moves with the wheel, and the inductor remains fixed to the towed transport platform frame.
Figure 22:
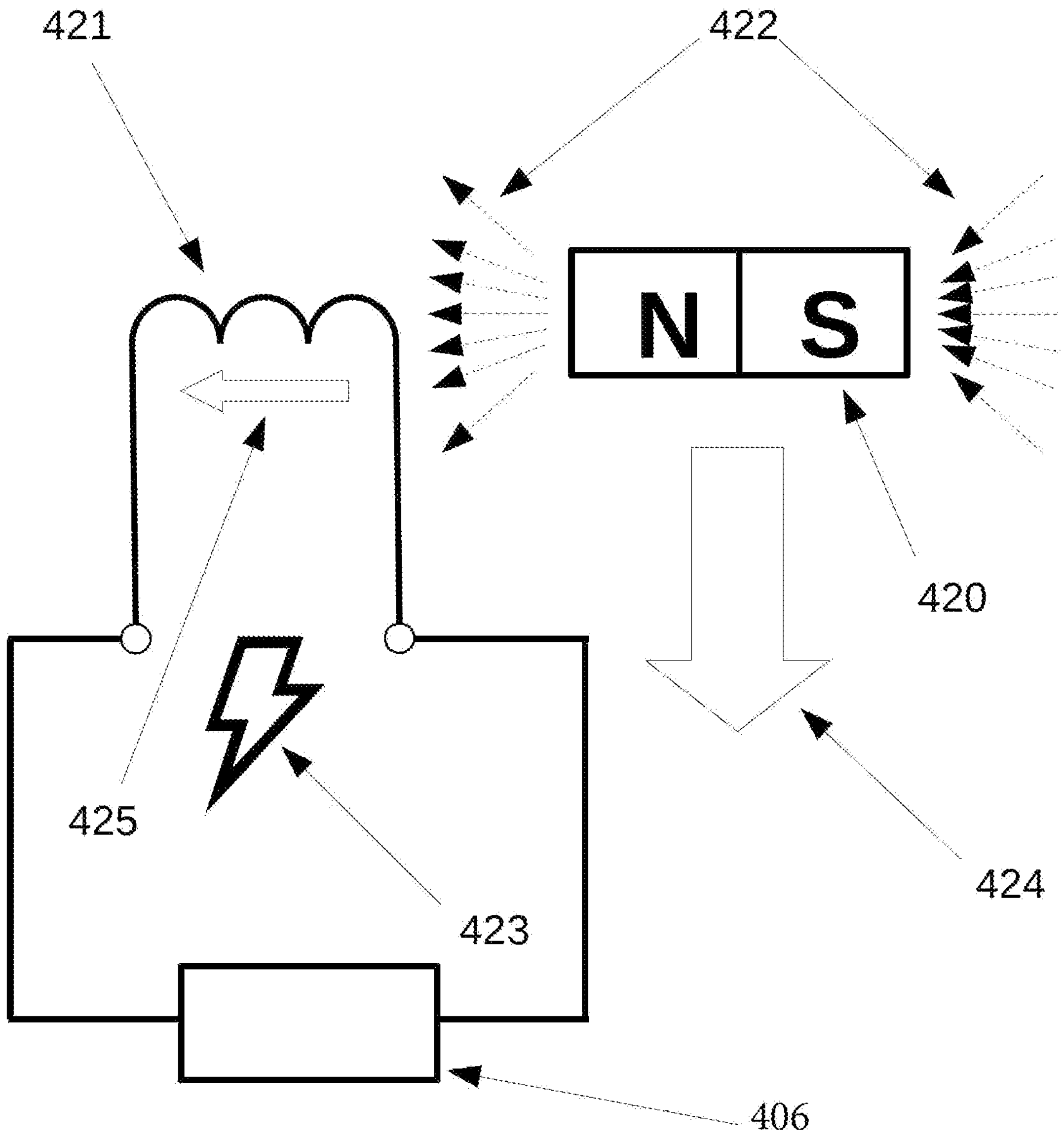
FIG. 22 shows symbolically a magnet and its magnetic flux moving past an inductor, inducing electric current, which generates electrical power.

100 tractor platform
101 chassis
102 intermodal container
103 towed transport platform
104 dry-van trailer
105 load
200 direction of towing
201 airflow
210 direction of loading
211 direction of unloading
212 direction of a tractor platform coupling with a towed transport platform
213 direction of a tractor platform uncoupling from a towed transport platform
220 rotation
221 rotation of a smaller meshed gear
300 roadway
301 geolocation
302 path taken
303 user interface display
400 shaft
401 turbine whose axis of rotation is oriented substantially perpendicular to the direction of motion of airflow, also known as a cross-flow turbine
402 turbine whose axis of rotation is oriented substantially at a fixed angle of 0° to the direction of motion of airflow, also known as an axial turbine
403 electric generator
404 battery
405 capacitor
406 electrical energy storage device
407 flywheel
408 spring
410 wheel
411 tire
412 axle
413 large gear
414 small gear
415 towed transport platform frame
420 magnet
421 inductor

422 magnetic flux

423 electrical power induced by a magnet and its magnetic flux moving past an inductor

424 motion of a magnet and its magnetic flux moving past an inductor

425 electric current flowing through an inductor

DETAILED DESCRIPTION OF THE INVENTION

Some definitions of terms used are as follows.

Coupling Terminology

In one embodiment, if a first physical object is physically coupled to a second physical object and said is to a third physical object, then said is to said third physical object.

In one embodiment, if a is to a then said is to said.

In one embodiment, a is to a and said may rotate independently of said.

In one embodiment, a first electronic device is electrically coupled to a second electronic device if said first electronic device can send to said second electronic device.

In one embodiment, if a first electronic device is to a second electronic device then said second electronic device is to said first electronic device.

Trucking Terminology

In one embodiment, a towed transport platform comprises a means for supporting a load and for being towed on a road.

In one embodiment, a comprises a trailer.

In one embodiment, a comprises a semi-trailer.

In one embodiment, a comprises a.

In one embodiment, a tractor platform comprises a motive power source and a means for towing a.

In one embodiment, an intermodal container comprises a standardized shipping container designed and built for intermodal freight transport.

In one embodiment, a chassis comprises a with a means for physically coupling one or more s to said.

Energy and Physics Terminology

In one embodiment, kinetic mechanical energy comprises the kinetic energy of a mechanical system.

In one embodiment, comprises the linear and rotational motion of a.

In one embodiment, comprises the of a that is independent of the potential energy of said.

In one embodiment, rotational mechanical energy comprises the rotational component of a 's.

In one embodiment, mechanical power comprises expended per unit time.

Power Generation Terminology

In one embodiment, a kinetic motion power generator comprises a means for converting kinetic energy into electrical power.

In one embodiment, a comprises a means for converting from the motion of a into.

In one embodiment, a dynamo comprises a means for converting into.

In one embodiment, a comprises a.

In one embodiment, an electric generator comprises a means for converting into.

In one embodiment, an comprises a means for converting rotation into.

In one embodiment, a comprises an.

In one embodiment, a turbine comprises a means for converting the of a moving fluid into.

In one embodiment, a comprises a means for converting the of airflow resulting from the motion of a into.

In one embodiment, a comprises a means for converting airflow into rotation.

In one embodiment, a turbine electric generator comprises a to an wherein the of said is converted into by means of said.

In one embodiment, a comprises a.

In one embodiment, a comprises a.

In one embodiment, a gearing comprises a means for transmitting from one to another.

In one embodiment, a comprises a means for transmitting the rotation of one to another.

In one embodiment, a geared electric generator comprises an to a that is to a source wherein the energy of said source is converted into by means of said.

In one embodiment, a source comprises a wheel that rotates when said is in motion.

In one embodiment, a rotating wheel component comprises a wheel, tire, axle, or other component of a wheel that rotates when said wheel rotates.

In one embodiment, a comprises a of a wheel.

In one embodiment, a comprises an to a that is to a wherein of said is converted into by means of said.

In one embodiment, a comprises a.

In one embodiment, a comprises a.

In one embodiment, a magnet comprises a body having the property of attracting iron and producing a magnetic field external to itself.

In one embodiment, a comprises a body producing a magnetic flux external to itself.

In one embodiment, a magnet comprises a means for producing magnetic flux.

In one embodiment, an inductor comprises an electrically conductive material arranged in one or more coils such that a change in magnetic flux along the axis of said coil induces an electric current in said coil.

In one embodiment, an comprises a means for converting changing magnetic flux into.

In one embodiment, a change in magnetic flux induces in an.

In one embodiment, a passing by an induces in said.

In one embodiment, an energy storage device comprises a means for converting power into and a means for converting said back into power.

In one embodiment, an electrical energy storage device comprises a means for converting into.

In one embodiment, an comprises a means for converting into and a means for converting said back into.

In one embodiment, an comprises a battery.

In one embodiment, an comprises a capacitor.

In one embodiment, an comprises an.

In one embodiment, a mechanical energy storage device comprises a means for converting into.

In one embodiment, a comprises a means for converting into.

In one embodiment, a comprises a means for converting into and a means for converting said into.

In one embodiment, a comprises a means for converting into.

In one embodiment, a comprises a means for converting rotation into.

In one embodiment, a comprises a spring system comprising one or more springs, a means for converting into potential energy stored in said springs and a means for releasing said potential energy back into.

In one embodiment, a comprises a flywheel system comprising one or more flywheels, a means for converting into stored in said flywheels and a means for releasing said back into.

In one embodiment, an comprises a.

Geolocation Terminology

In one embodiment, a geolocation comprises the identification or estimation of the real-world geographic location of an object.

In one embodiment, a comprises a latitude and a longitude.

In one embodiment, a comprises a latitude, a longitude, and an altitude.

In one embodiment, a comprises a geographic location expressed in an earth-based coordinate system.

In one embodiment, a comprises a time measurement.

In one embodiment, a satellite-based radio-navigation system comprises a global navigation satellite system ("GNSS").

In one embodiment, a comprises the United States' Global Positioning System ("GPS").

In one embodiment, a comprises Russia's GLONASS.

In one embodiment, a comprises the European Union's Galileo system.

In one embodiment, a comprises China's BeiDou Navigation Satellite System ("BDS").

In one embodiment, a comprises India's IRNSS.

In one embodiment, a comprises Japan's QZSS.

In one embodiment, a is measured by means of one or more s.

In mathematics, a hyperbola is defined as the set of points such that for any point P of the set, the absolute difference of the distances from P to two fixed points is constant.

In one embodiment, a geolocation hyperbola comprises a hyperbola wherein said two fixed points are the s of two stations broadcasting radio signals.

In one embodiment, a means for constructing a of the set of possible s of a radio receiver comprises measuring the time delay of a signal sent from each broadcasting station to said within an interval of time and calculating the absolute difference of the distances from said to said broadcasting stations as the difference in said time delays multiplied by the speed of light.

In one embodiment, a multilateration algorithm comprises a means for measuring the of a calculated as the intersection of two s for said wherein said two s are calculated using no fewer than three broadcasting stations.

In one embodiment, a comprises a means for measuring a based on measurements of the distance to three or more stations at known s by broadcast signals at known times, wherein said is calculated by means of triangulation.

In one embodiment, a is measured by means of a wherein said stations are cellular phone towers.

In one embodiment, a multilateration navigation system comprises means for determining a by means of a.

In one embodiment, a navigation system comprises a means for reading one or more s by means of either a or a.

In one embodiment, a comprises a plurality of s.

In one embodiment, a comprises a means for reading one or more s by means of a plurality of s and s.

State and Event Terminology

In one embodiment, a towed transport platform state comprises a state of a.

In one embodiment, a comprises a state of a at a given point in time.

In one embodiment, a comprises the of a.

In one embodiment, a comprises whether or not a is to a.

In one embodiment, a comprises whether or not a is electrically coupled to a.

In one embodiment, a comprises whether or not an is to a.

In one embodiment, a comprises whether a door to said is open or closed.

In one embodiment, a comprises whether or not said is moving.

In one embodiment, a comprises whether or not cellular network jamming is being detected at said's location.

In one embodiment, a towed transport platform event comprises a change in a.

In one embodiment, a towed transport platform event comprises said transitioning between a stationary state and moving state.

In one embodiment, a comprises a change in the of said.

In one embodiment, a comprises an impact of said with another physical object.

In one embodiment, a comprises said undergoing an unusual rotation.

In one embodiment, a comprises the physical connection of said to a.

In one embodiment, a comprises the physical disconnection of said from a.

In one embodiment, a comprises the electrical connection of said to a.

In one embodiment, a comprises the electrical disconnection of said from a.

In one embodiment, a comprises the physical coupling of an to a.

In one embodiment, a comprises the physical uncoupling of an from a.

In one embodiment, a comprises the opening or closing of a door to said.

In one embodiment, a comprises the starting or ending of cellular network jamming in the vicinity of said at said towed transport platform's location.

Monitoring System Terminology

In one embodiment, a monitoring system comprises a means for reading a.

In one embodiment, a comprises a means for recording a.

In one embodiment, a comprises a means for transmitting a.

In one embodiment, a comprises a means for detecting a.

In one embodiment, a comprises a means for recording a.

In one embodiment, a comprises a means for transmitting a.

In one embodiment, a is to a.

In one embodiment, a computational device comprises a means for manipulating electronic signals and executing algorithms.

Although the different examples of tracking devices, systems, and methods may be described herein separately, any of the features of any of the examples may be added to, omitted from, or combined with any other example.

A tracking system coupled to an unpowered towed transport platform requires electrical power, yet these unpowered assets do not have a source of electrical power. However, intermittent power sources, such as solar panels, brake light power, a charging port, kinetic energy harvesting devices, inductive coils, turbines, generators driven by wheels, piezoelectric devices, and others, may be coupled to these unpowered assets to provide power intermittently under the right conditions. For example, solar panels may provide power when in sunlight or other light; brake light power is available when the brakes are used; a charging port provides power when connected to an electrical outlet, external battery, supercapacitor, generator, or other electrical power source; turbines may provide power when in wind or airflow from motion; wheel generators may provide power when the asset's wheels are turning; inductive coils may provide power when moving within a changing magnetic field; and kinetic energy harvesting and piezoelectric devices may provide power when the asset is moving in a manner conducive to the respective device's manner of power generation.

Power is the rate at which energy is transformed per unit time. Because an intermittent power source does not provide power constantly, some of the power must be converted to stored energy when the power is available so that the stored energy may be converted back to power to run the tracking system when the intermittent power source is not producing power. Depending on the intermittent power source, the power source may produce power spikes some of the time and much less or no power at other times. When a power spike occurs, any power from the power source that exceeds the operational parameters of the system must be converted to energy instantly or be permanently lost.

Traditionally, batteries have been used to store intermittent power, such as solar power, for unpowered towed transport platform tracking systems. However, batteries have several drawbacks.

First, batteries take a long time to charge. Lithium-ion, NiCad, and NiMH batteries typically require an hour to fully charge, and sealed lead-acid batteries typically require four hours. If a battery is used to store intermittent power, then either a very large battery or bank of batteries must be used to store the energy from power spikes, or a substantial amount of available energy will be lost. The batteries required to capture this energy are typically much larger than would normally be used to power a tracking system.

Second, batteries have a relatively short lifetime, limited by the number of charging cycles. The following life cycle ratings were retrieved on Aug. 14, 2023. Lithium-ion batteries usually have a lifetime of between 400 and 1,200 charging cycles. A typical NiCad battery has a lifetime of 2,000 charging cycles. NiMH batteries have a lifetime of between 180 and 2,000 charging cycles. A sealed lead-acid battery has a lifetime of between 500 and 1,300 charging cycles.

Third, there are substantial power losses when charging and discharging batteries, collectively known here as power losses. This is because charging and discharging cause a chemical reaction in the battery that produces heat. Using the same information resources as the preceding paragraph, Lithium-ion battery power losses are as high as 20%; NiCad power losses are around 20%; NiMH power losses are between 8% and 34%; and sealed lead-acid power losses are between 5% and 50%.

Fourth, battery charging circuits are complex and expensive. Typically, batteries must be charged slowly when at low voltage, then charged rapidly until nearly full, and then charged at a trickle when close to fully charged. These circuits must often take the temperature of the battery into account as battery chemistries perform differently at different temperatures.

Existing trackers for unpowered towed transport platforms use any combination of solar panels, rechargeable or replaceable batteries, and intermittent brake light power (e.g., mainly in the case of semi-trailers).

While a solar panel may charge a battery enough to run a tracker for a few minutes per day, the energy stored is not adequate to provide frequent updates, such as during a trip of an hour or more. Solar power may not be available during a trip for a number of reasons, including weather, time of day, and solar panel orientation.

While a rechargeable or replaceable battery may provide enough power to provide frequent updates during a trip, they must be recharged or replaced at regular intervals, which places an impractical maintenance burden on users. Some unpowered towed transport platforms, such as intermodal containers, constantly move around the world, being passed from one user to the next, making battery changes even more impractical.

While a brake light powered tracker for a semi-trailer may provide enough power to provide frequent updates during a trip, the brake lights may not charge a dead tracker battery sufficiently at the start of the trip to provide updates then or at other times in the trip when the brake lights are not on for an extended period. The battery will only be partially charged unless the brake lights are on for at least an hour, which is probably rare. Also, this solution does not work for unpowered towed transport platforms without brake lights, such as intermodal containers, rail cars, barges, many aircraft ground equipment ("AGE"), and others.

In some of the examples described herein, one or more intermittent power sources are electrically coupled to one or more capacitors and to a tracking system that is physically coupled to an unpowered towed transport platform. The intermittent power sources include any combination of solar panels, brake light power, power via a charging port, kinetic energy harvesting devices, inductive coils, turbines, generators driven by wheels, piezoelectric devices, and others. In some examples, supercapacitors are used as the capacitors. Many of the examples use no batteries, which is significantly different from conventional systems.

The capacitors rapidly store any excess power provided by the intermittent power source when supplying power, until the capacitors are fully charged. This configuration enables the capacitors to power the tracking system when the power sources are not available or are not providing power.

One of the potential advantages of these examples over conventional solutions is that capacitors can capture excess power much more rapidly than batteries. For example, the fastest charging commonly available batteries require an hour (e.g., 3,600 seconds) to fully charge, whereas a capacitor can be fully charged in a few seconds or less (e.g., roughly one thousand times faster). This enables the capacitor to capture much more energy during a power spike from an intermittent power source than known battery systems. Second, the conversion of power to and from stored energy in capacitors is nearly lossless, whereas batteries often lose 10% to 20% of the power used to charge them. Third, supercapacitors have much longer lifetimes than batteries as measured in charge/discharge cycles. Supercapacitors have a lifetime of between 20,000 and 1,000,000 charging cycles, which is one or two orders of magnitude more than batteries. Fourth, the circuitry for charging capacitors is much simpler and cheaper than those for charging batteries, as supercapacitors may be charged at either a constant current or a constant power throughout the charge cycle, and their charge rate is not materially affected by temperature.

First Embodiment

Description

The first embodiment comprises a machine for generating from the airflow of a moving. This machine comprises a to an that is to said.

Operation

In the, when said is in motion, the resulting airflow causes said to rotate which, in turn, causes said to generate.

Second Embodiment

Description

The second embodiment comprises the first embodiment and an to said. The second embodiment converts said into.

Operation

The operation of the second embodiment comprises said converting said into said.

Third Embodiment

Description

The third embodiment comprises the first embodiment and a to said. The third embodiment converts said rotation of said into.

Operation

The operation of the third embodiment comprises said converting said rotation of said into said.

Fourth Embodiment

Description

The fourth embodiment comprises the first embodiment wherein said's axis of rotation is oriented substantially perpendicular to the direction of motion of said airflow. Said airflow causes the rotation of said.

Operation

In the fourth embodiment, when said is in motion, the resulting airflow, substantially perpendicular to said's axis of rotation, causes said to rotate which, in turn, causes said to generate.

Fifth Embodiment

Description

The fifth embodiment comprises the first embodiment wherein said's axis of rotation is oriented substantially at a fixed angle to the direction of motion of said airflow. Said airflow causes the rotation of said.

Operation

In the fifth embodiment, when said is in motion, the resulting airflow, substantially at a fixed angle to said's axis of rotation, causes said to rotate which, in turn, causes said to generate.

Sixth Embodiment

Description

The sixth embodiment comprises a machine for generating from the motion of a. This machine comprises a to said, a to said and an to said.

Operation

In the sixth embodiment, when said is in motion, this causes the rotation of said, said transmits said rotation to said, and said converts said transmitted rotation into said.

Seventh Embodiment

Description

The seventh embodiment comprises the sixth embodiment and an to said. The seventh embodiment converts said into.

Operation

The operation of the seventh embodiment comprises said converting said into said.

Eighth Embodiment

Description

The eighth embodiment comprises the sixth embodiment and a to said. The eighth embodiment converts said rotation of said into.

Operation

The operation of the eighth embodiment comprises said transmitting said rotation of said to said, which converts said transmitted rotation into said.

Ninth Embodiment

Description

The ninth embodiment comprises the sixth embodiment wherein said comprises an axle of said.

Operation

In the ninth embodiment, when said is in motion, this causes the rotation of said axle, said transmits said rotation to said, and said converts said transmitted rotation into said.

Tenth Embodiment

Description

The tenth embodiment comprises the sixth embodiment wherein said comprises a wheel of said.

Operation

In the tenth embodiment, when said is in motion, this causes the rotation of said wheel, said transmits said rotation to said, and said converts said transmitted rotation into said.

Eleventh Embodiment

Description

The eleventh embodiment comprises the sixth embodiment wherein said comprises a tire of said.

Operation

In the eleventh embodiment, when said is in motion, this causes the rotation of said tire, said transmits said rotation to said, and said converts said transmitted rotation into said.

Twelfth Embodiment

Description

The twelfth embodiment comprises a machine for generating from the motion of a. This machine comprises a to said, a to said, and an to said.

Operation

In the twelfth embodiment, when said is in motion, this causes the rotation of said, which causes said to pass by said, which induces said in said.

Thirteenth Embodiment

Description

The thirteenth embodiment comprises the twelfth embodiment and an to said s. The thirteenth embodiment converts said into.

Operation

The operation of the thirteenth embodiment comprises said converting said into said.

Fourteenth Embodiment

Description

The fourteenth embodiment comprises the twelfth embodiment, a to said and a to said. The fourteenth embodiment converts said rotation of said into.

Operation

The operation of the fourteenth embodiment comprises said transmitting said rotation of said to said and said converting said transmitted rotation into said.

Fifteenth Embodiment

Description

The fifteenth embodiment comprises the twelfth embodiment wherein said comprises an axle of said.

Operation

In the fifteenth embodiment, when said is in motion, this causes the rotation of said axle, which causes said to pass by said, which induces said in said.

Sixteenth Embodiment

Description

The sixteenth embodiment comprises the twelfth embodiment wherein said comprises a wheel of said.

Operation

In the sixteenth embodiment, when said is in motion, this causes the rotation of said wheel, which causes said to pass by said, which induces said in said.

Seventeenth Embodiment

Description

The seventeenth embodiment comprises the twelfth embodiment wherein said comprises a tire of said.

Operation

In the seventeenth embodiment, when said is in motion, this causes the rotation of said tire, which causes said to pass by said, which induces said in said.

Eighteenth Embodiment

Description

The eighteenth embodiment comprises a method for generating from the motion of a moving. This embodiment utilizes a and an.

Operation

When said is in motion, said to passes by said, inducing said in said.

Nineteenth Embodiment

Figure 23:
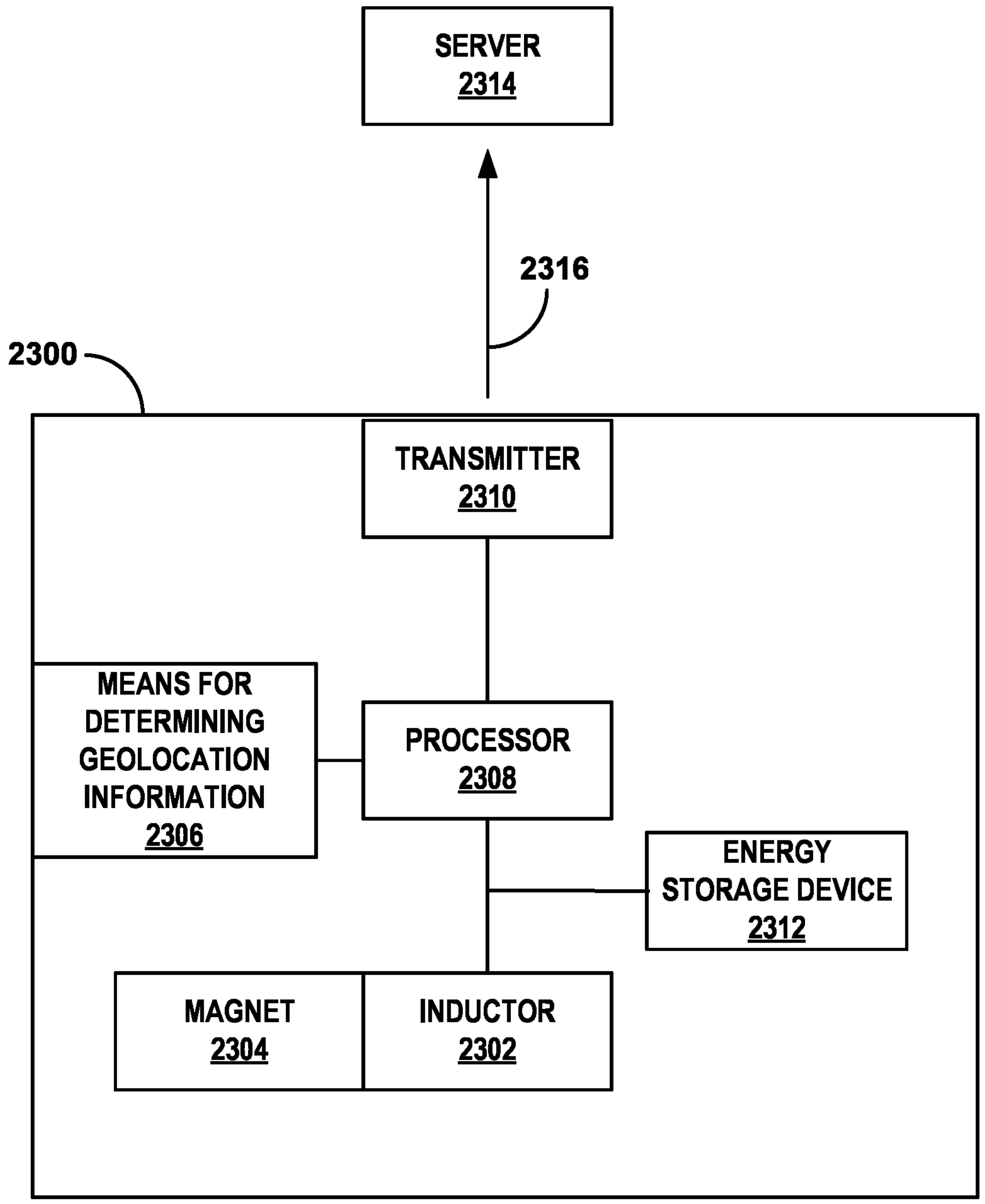
FIG. 23 shows a block diagram of an example of a monitoring system configured to monitor a shipping container. The monitoring system induces electrical power from the movement of a transport platform to which the shipping container is coupled, determines and logs geolocation information of the shipping container, and transmits at least a portion of the determined geolocation information to a server.

FIG. 23 shows a block diagram of an example of a monitoring system configured to monitor a shipping container. The monitoring system induces electrical power from the movement of a transport platform to which the shipping container is coupled, determines and logs geolocation information of the shipping container, and transmits at least a portion of the determined geolocation information to a server. In the example shown in FIG. 23, monitoring system 2300 is configured to monitor a shipping container. Monitoring system 2300 comprises inductor 2302 and magnet 2304 disposed such that relative movement between magnet 2304 and inductor 2302 caused by movement of a transport platform to which the shipping container is coupled induces electrical power. Monitoring system 2300 further comprises means for determining geolocation information 2306 of the shipping container. Monitoring system 2300 also comprises processor 2308 electrically coupled to inductor 2302. In the example shown in FIG. 23, processor 2308 is configured to log a set of the determined geolocation information of the shipping container. Monitoring system 2300 additionally comprises transmitter 2310, which is configured to transmit, via transmission 2316, at least a portion of the set of determined geolocation information to server 2314. In the example shown in FIG. 23, transmission 2316 is a cellular transmission. Monitoring system 2300 further comprises energy storage device 2312 coupled to inductor 2302. Energy storage device 2312 is configured to store excess electrical energy during a first time period and to provide the stored electrical energy to monitoring system 2300 during a second time period.

Twentieth Embodiment

Figure 24:
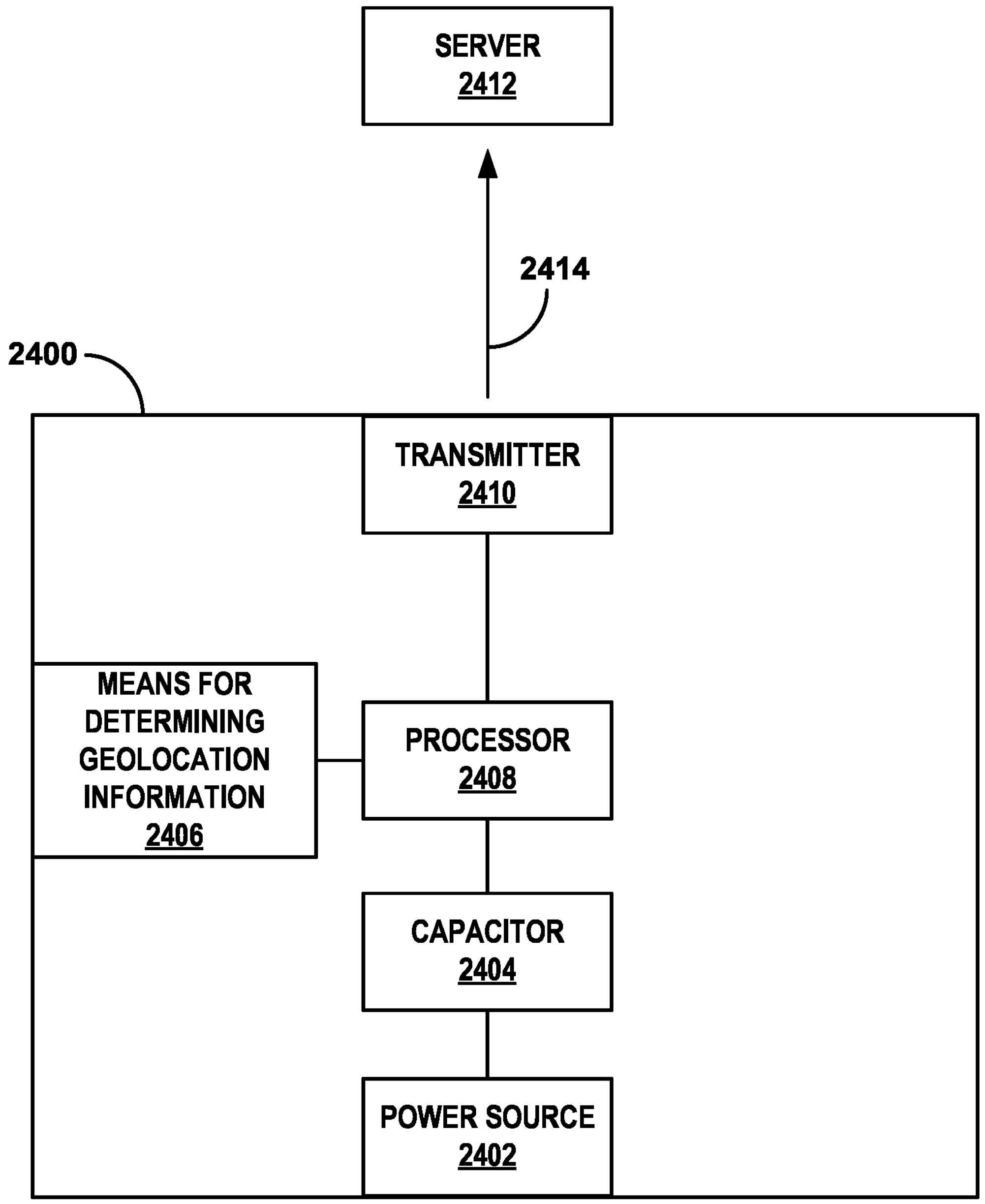
FIG. 24 shows a block diagram of an example of a system to track a geolocation of an asset. The system comprises a capacitor electrically coupled to receive electrical power from a power source, a means for determining geolocation information of the asset, and a processor to log a set of the determined geolocation information of the asset. The system additionally comprises a transmitter to transmit at least a portion of the set of determined geolocation information to a server. Once charged by the power source, the capacitor powers the means for determining geolocation information, the processor, and the transmitter. The system does not include a battery electrically coupled to the processor.

FIG. 24 shows a block diagram of an example of a system to track a geolocation of an asset. In some examples, the asset may be an unpowered towed transport platform such as an intermodal container, an intermodal chassis, a semi-trailer, a rail car, a barge, aircraft ground equipment ("AGE"), or any other such asset that has no intrinsically available power source. In other examples, the asset can be any other suitable item that an interested party may wish to track.

In the example shown in FIG. 24, system 2400 is configured to track a geolocation of an asset. System 2400 comprises capacitor 2404 electrically coupled to receive electrical power from power source 2402. In the example shown in FIG. 24, capacitor 2404 is a supercapacitor.

In some examples, power source 2402 is an intermittent power source. Examples of intermittent power sources include: a photovoltaic (PV) array comprising one or more PV cells, a brake light system of a transport platform to which the asset is coupled, and a kinetic energy harvesting device. Of course, any other suitable intermittent power source could be utilized to provide electrical power to capacitor 2404, in other examples.

In the examples in which a kinetic energy harvesting device is power source 2402, the kinetic energy harvesting device may include: a device that harvests kinetic energy from ambient fluid moving around the asset (while the asset is moving or stationary), a device that harvests kinetic energy from a rotating wheel component of a transport platform to which the asset is coupled, a piezoelectric device, and an inductor and a magnet disposed such that relative movement between the magnet and the inductor caused by movement of a transport platform to which the asset is coupled induces electrical power.

It should be appreciated that, in some examples, more than one power source may provide electrical power to capacitor 2404. For example, multiple intermittent power sources may provide electrical power to capacitor 2404. In other examples, multiple non-intermittent power sources may provide electrical power to capacitor 2404. In still further examples, one or more intermittent power sources and one or more non-intermittent power sources may provide electrical power to capacitor 2404.

Regardless of the type or number of power sources that provide power to capacitor 2404, system 2400 further comprises means for determining geolocation information 2406 of the asset. System 2400 also comprises processor 2408, which is configured to log a set of the determined geolocation information of the asset. System 2400 additionally comprises transmitter 2410, which is configured to transmit, via transmission 2414, at least a portion of the set of determined geolocation information to server 2412. In the example shown in FIG. 24, transmission 2414 is a cellular transmission.

In operation, power source 2402 charges capacitor 2404. Once charged, capacitor 2404 powers means for determining geolocation information 2406, processor 2408, and transmitter 2410. System 2400 does not include a battery electrically coupled to processor 2408.

Twenty-First Embodiment

Figure 25:
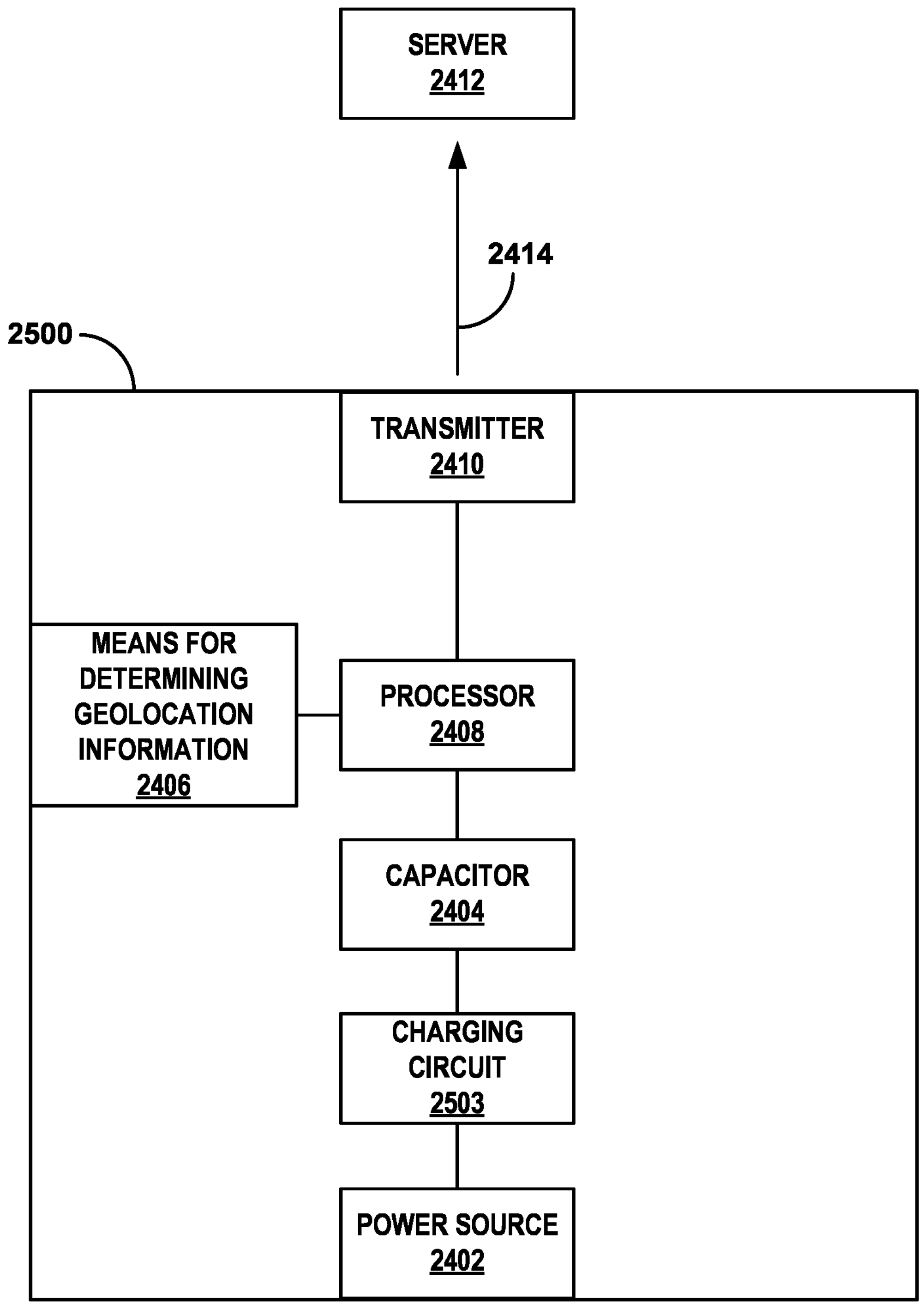
FIG. 25 shows a block diagram of an example of a system to track a geolocation of an asset. The example shown in FIG. 25 is similar to FIG. 24, but the system further includes a charging circuit that receives electrical power from a power source and charges the capacitor with the electrical power received from the power source.

FIG. 25 shows a block diagram of an example of a system to track a geolocation of an asset. In the example shown in FIG. 25, system 2500 is similar to system 2400 of FIG. 24 but further includes charging circuit 2503. In some examples, charging circuit 2503 receives electrical power from power source 2402 and charges capacitor 2404 with the electrical power received from power source 2402.

In some examples, charging circuit 2503 is a constant current circuit. In other examples, charging circuit 2503 is a constant power circuit. In further examples, charging circuit 2503 is a maximum power point tracking (MPPT) circuit.

Twenty-Second Embodiment

Figure 26:
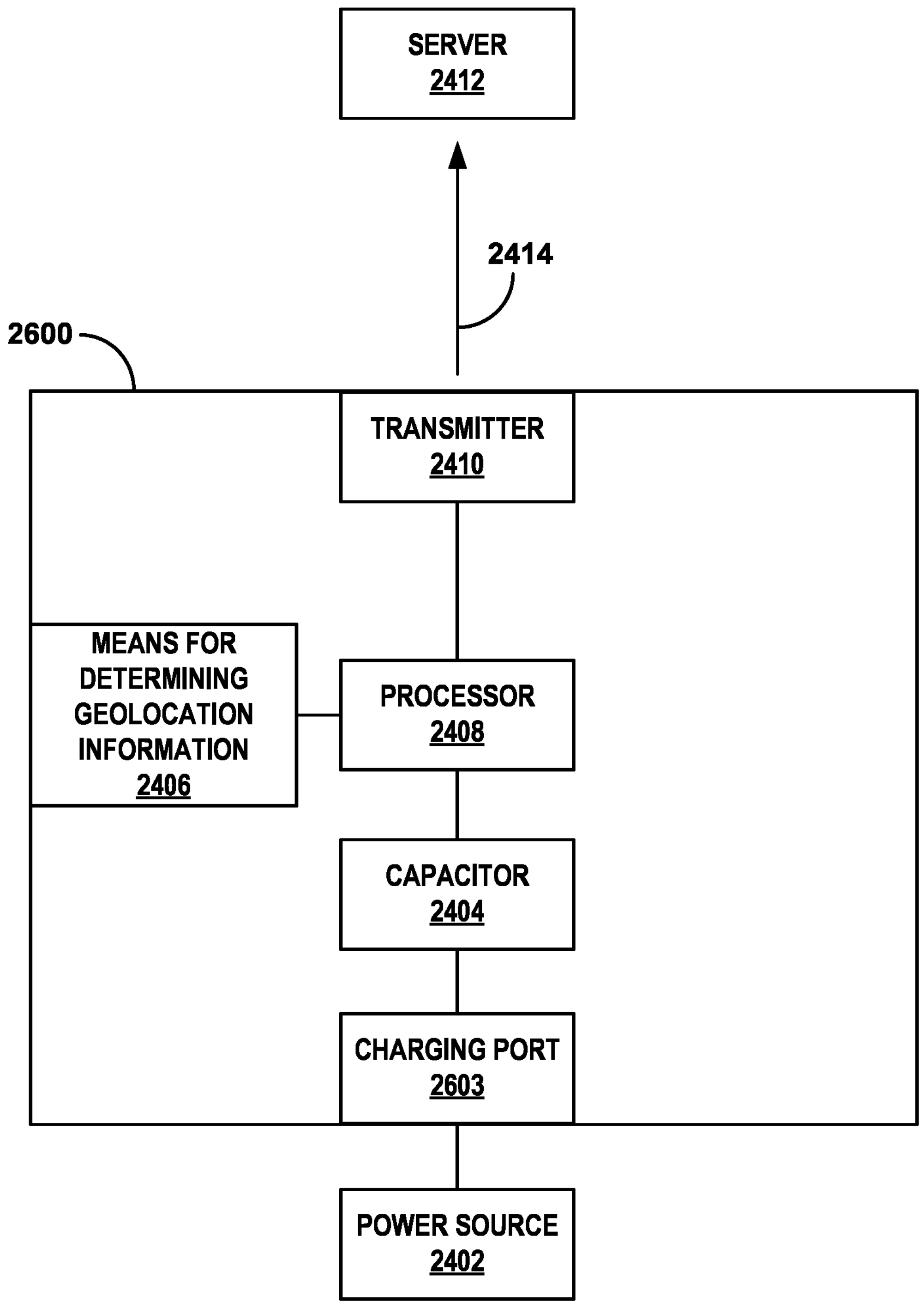
FIG. 26 shows a block diagram of an example of a system to track a geolocation of an asset. The example shown in FIG. 26 is similar to FIG. 24, but the system further includes a charging port that receives electrical power from a power source and provides the electrical power to the capacitor.

FIG. 26 shows a block diagram of an example of a system to track a geolocation of an asset. In the example shown in FIG. 26, system 2600 is similar to system 2400 of FIG. 24 but further includes charging port 2603. In some examples, charging port 2603 receives electrical power from power source 2402 and provides electrical power to capacitor 2404. In some examples, power source 2402 may be an electrical outlet, external battery, supercapacitor, generator, or other electrical power source. Of course, any other suitable power source may be used to provide electrical power to capacitor 2404.

In some examples, system 2600 may be physically coupled to the asset and can move with the asset, but power source 2402 is not physically coupled to the asset and does not move with the asset. In other examples, however, system 2600 and power source 2402 may both be physically coupled to the asset and can move with the asset. In further examples, a user may have the option to select whether to physically couple power source 2402 to the asset.

Twenty-Third Embodiment

Figure 27:
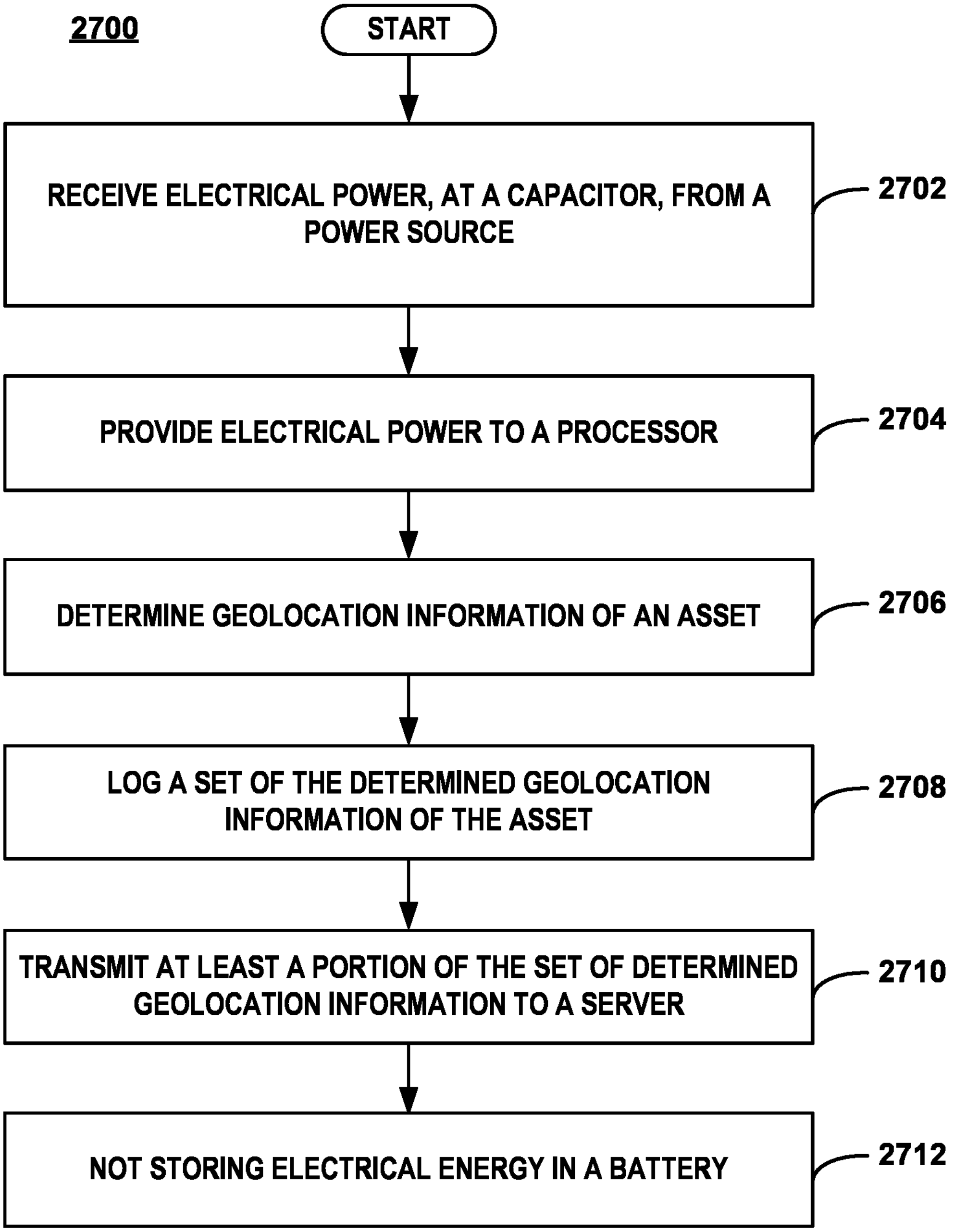
FIG. 27 is a flowchart of an example of a method for tracking a geolocation of an asset.

FIG. 27 is a flowchart of an example of a method for tracking a geolocation of an asset. The method 2700 begins at step 2702 with receiving, at a capacitor, electrical power from a power source. At step 2704, the capacitor provides the electrical power to a processor. At step 2706, geolocation information of the asset is determined. At step 2708, the processor logs a set of the determined geolocation information of the asset. At step 2710, at least a portion of the set of determined geolocation information is transmitted to a server. Method 2700 does not include storing electrical energy in a battery.

In examples in which the system includes a charging circuit, as shown in connection with FIG. 25, method 2700 may further include receiving, at the charging circuit, electrical power from the power source and charging the capacitor with the electrical power received from the power source. In examples in which the system includes a charging port, as shown in connection with FIG. 26, method 2700 may further include receiving, at the charging port, electrical power from the power source and providing electrical power to the capacitor.

In other examples, one or more of the steps of method 2700 may be omitted, combined, performed in parallel, or performed in a different order than that described herein or shown in FIG. 27. In still further examples, additional steps may be added to method 2700 that are not explicitly described in connection with the example shown in FIG. 27.

As previously discussed, interested parties would like to track the geolocation of one or more assets, some of which may be coupled to a moving transport platform. Many existing global navigation satellite systems ("GNSS") have an accuracy of around 5 meters. However, some parties would like to track these assets with an accuracy of a few centimeters ("centimeter accuracy"). Some of the examples described herein utilize a correction technique to improve the GNSS tracking accuracy of an intermittently powered asset tracking device to within a few centimeters.

For example, in supply chain logistics, intermodal shipping containers ("containers") need to be loaded onto and unloaded off of a container ship as rapidly as possible. Containers are towed to and from a port by a semi-tractor towing an intermodal chassis ("chassis"), a special semi-trailer designed to carry a container. Containers may be lifted off a ship and loaded onto a chassis, as well as lifted off of a chassis and onto a ship, rapidly using cranes on the dock next to the container ship. Container ships often stop at numerous ports in their journey. Therefore, containers must be loaded in an exact order when loading a ship so that they are on the top of the stack when they arrive at the port where they are to be unloaded. For optimal efficiency, both the semi-tractors and chassis waiting to be unloaded at a port of origin and those waiting to be loaded at a destination port should be queued at the port in the order that their containers will be unloaded and loaded, respectively. Several semi-tractor and chassis queues at a port may run in parallel to each other. Containers and chassis worldwide have a standardized width of 8.5 feet. The 5 meter (16.4 feet) accuracy of a GNSS reporting system on a container or chassis is therefore not precise enough to monitor in which parallel lane a container or chassis sits. Interested parties would like to monitor the geolocation of containers and chassis on the port with centimeter accuracy in order to manage these queues and other operations properly.

In other examples, centimeter accuracy enables interested parties to detect both that a dry-van trailer has been backed into a loading dock at a warehouse and at which loading dock this has occurred. Loading docks at a warehouse are often adjacent to each other. Thus, the 5 meter accuracy of a conventional GNSS reporting system is inadequate to determine at which loading dock a dry-van trailer has been parked.

In further examples, interested parties would like to know the altitude of a container with precision. For example, the altitude of a container can be used to calculate a container's level in a stack of containers on a ship, on the ground, or while the container is being lifted between a ship and the ground. Interested parties find this information useful for monitoring the container's progress. While GNSS systems provide an altitude measurement, this often has an error in the tens of meters, which is too imprecise to determine a container's level in a stack. Part of the reason for this imprecision is that GNSS systems estimate altitude based on a geoid model of the earth, such as WGS-84, and this model only provides a rough estimate of mean sea level at a given geolocation. Air pressure sensors provide a more accurate method of measuring altitude; however, air pressure sensor readings are affected by the variations in barometric pressure, which fluctuate over time. Altitude may be calculated from an air pressure sensor reading using a mathematical formula.

Logistics assets such as chassis and containers do not have a reliable power source for electronic tracking equipment ("trackers"). Many parties in the industry do not want to change the batteries for trackers as this is inconvenient, time consuming, labor intensive, and some assets, such as containers, are continuously circulating around the world. However, one or more intermittent power sources may be used to provide the energy to power this equipment. Examples of intermittent power sources include power generated when the motion of the asset causes a magnet to move past a conductive coil, solar panels, airflow turbines, generators powered by wheel rotation, brake light power, tail light power, kinetic energy capture devices, and piezoelectric energy capture devices.

GNSS receivers suffer from a phenomenon known as "drift." GNSS receivers report their geolocation repeatedly, often once or more times per second. If a GNSS receiver remains stationary in a geolocation where its antenna has a clear view of the sky, and the latitude and longitude pairs it reports are plotted, these points will drift around its geolocation in a star-like pattern. A statistical analysis of these points typically yields a roughly 5 meter error of the receiver.

The accuracy of a GNSS system may be substantially improved by calculating a correction that can be applied to each reading. After a period of time, the geolocation of a stationary GNSS receiver may be determined with centimeter accuracy by calculating a running average of all its geolocation readings. Then, for every new geolocation reading, a correction can be calculated by comparing the average geolocation with the geolocation read at that time. This correction for the time of the reading may then be applied to the geolocation read by another GNSS system in the same area at that time, potentially resulting in centimeter accuracy for the latter system's geolocation, even if it is in motion. The improvement in accuracy from applying a correction decreases the further the geolocation of the GNSS receiver being corrected is from the geolocation of the stationary GNSS receiver. Substantial accuracy may still be achieved when there are many miles between the geolocations.

As mentioned previously, air pressure sensor readings are affected by variations in barometric pressure. As with a GNSS system, the accuracy of an air pressure sensor reading may be dramatically improved by calculating a correction that can be applied to each reading. If a stationary air pressure sensor at a known altitude is located in the vicinity of the air pressure sensor in question and monitors the ambient air pressure during the same time period, then an air pressure sensor correction may be computed from its readings. This correction may be applied to readings of the air pressure sensor in question to yield a more accurate altitude. Similarly, this method is used to determine an aircraft's altitude with more accuracy. For example, pilots or their computers continuously monitor barometric pressure readings on the ground in their vicinity, and their air pressure sensors ("altimeters") correct the altitude output using this correction.

Twenty-Fourth Embodiment

Figure 28:
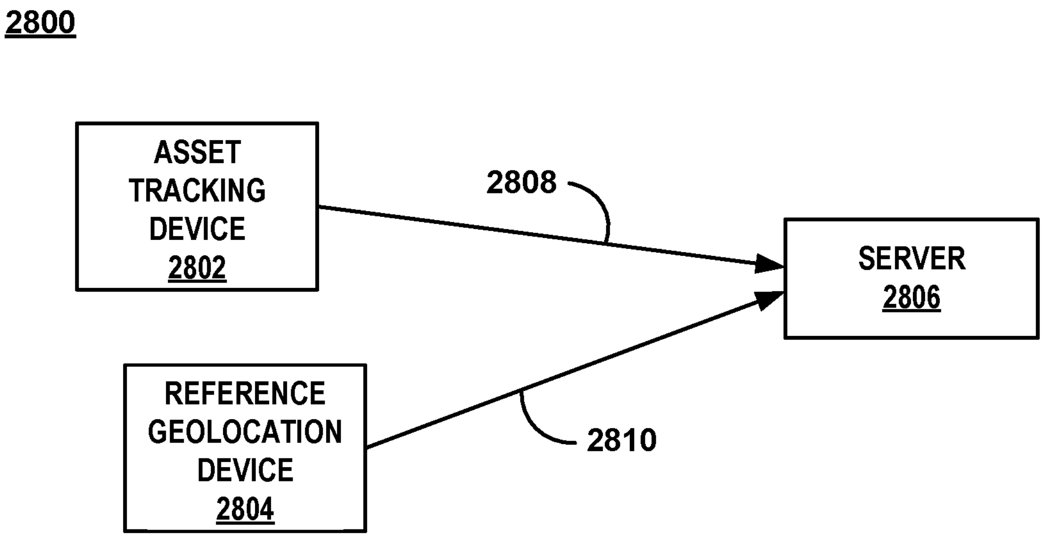
FIG. 28 shows a block diagram of an example of a system to track a geolocation of an asset with improved precision. The system comprises an asset tracking device coupled to the asset and powered by an intermittent power source, a reference geolocation device located at a reference geolocation, and a server.

FIG. 28 shows a block diagram of an example of a system to track a geolocation of an asset with improved precision. In the example shown in FIG. 28, system 2800 comprises asset tracking device 2802 coupled to the asset and powered by an intermittent power source, reference geolocation device 2804 located at a reference geolocation, and server 2806.

In the example shown in FIG. 28, asset tracking device 2802 is coupled to the asset and is powered by an intermittent power source. Examples of intermittent power sources include: a photovoltaic (PV) array comprising one or more PV cells, a brake light system of a transport platform to which the asset is coupled, a tail light system of a transport platform to which the asset is coupled, and a kinetic energy harvesting device. Of course, any other suitable intermittent power source could be utilized to provide electrical power to asset tracking device 2802, in other examples.

In the examples in which the intermittent power source is a kinetic energy harvesting device, the kinetic energy harvesting device may include one or more of the following: a device that harvests kinetic energy from ambient fluid moving around the asset (while the asset is moving or stationary), a device that harvests kinetic energy from a rotating wheel component of a transport platform to which the asset is coupled, a piezoelectric device, and an inductor and a magnet disposed such that relative movement between the magnet and the inductor caused by movement of a transport platform to which the asset is coupled induces electrical power.

It should be appreciated that, in some examples, more than one power source may provide electrical power to asset tracking device 2802. For example, multiple intermittent power sources may provide electrical power to asset tracking device 2802. In other examples, multiple non-intermittent power sources may provide electrical power to asset tracking device 2802. In still further examples, one or more intermittent power sources and one or more non-intermittent power sources may provide electrical power to asset tracking device 2802.

Figure 29:
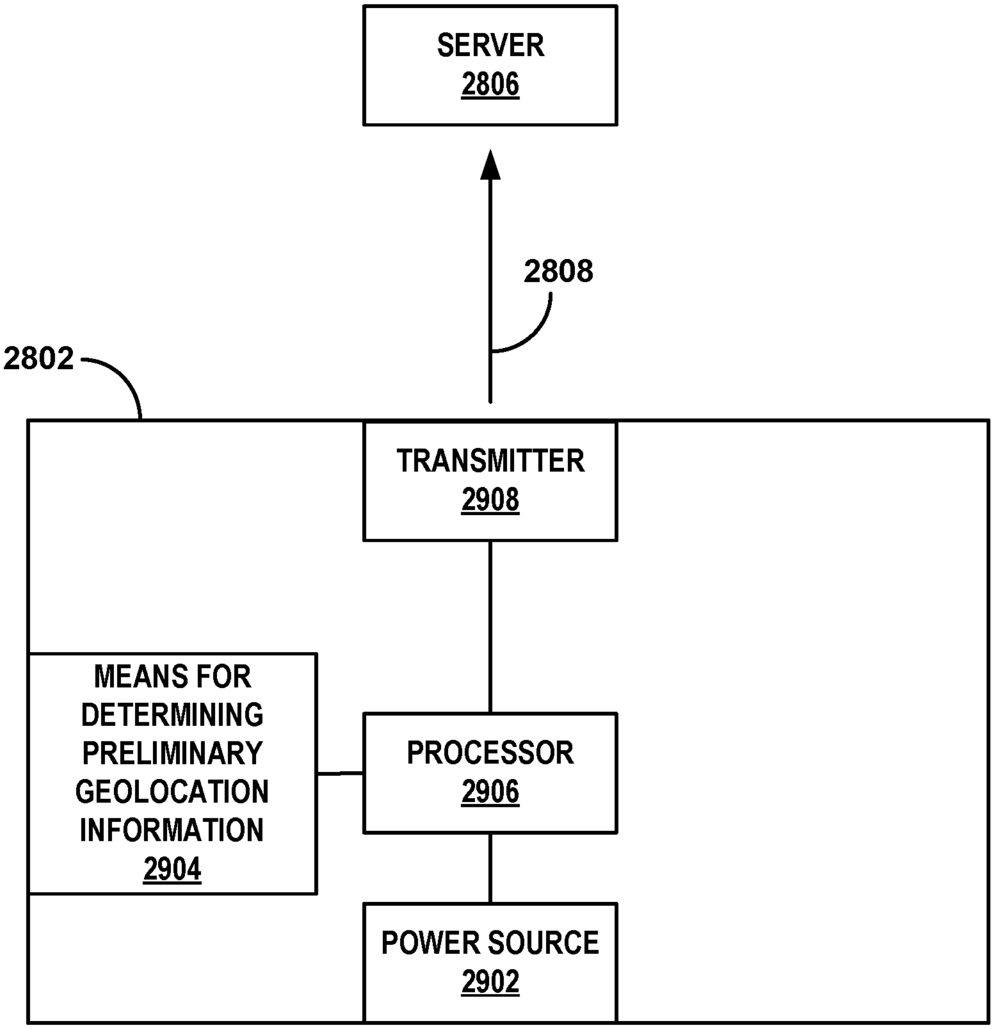
FIG. 29 shows a block diagram of an example of the asset tracking device shown in FIG. 28.

FIG. 29 shows a block diagram of an example of asset tracking device 2802 shown in FIG. 28. In the example shown in FIGS. 28 and 29, asset tracking device 2802 comprises means for determining preliminary geolocation information of the asset 2904, processor 2906 to log a set of the determined preliminary geolocation information of the asset, and transmitter 2908 to transmit at least a portion of the set of determined preliminary geolocation information to server 2806.

Figure 30:
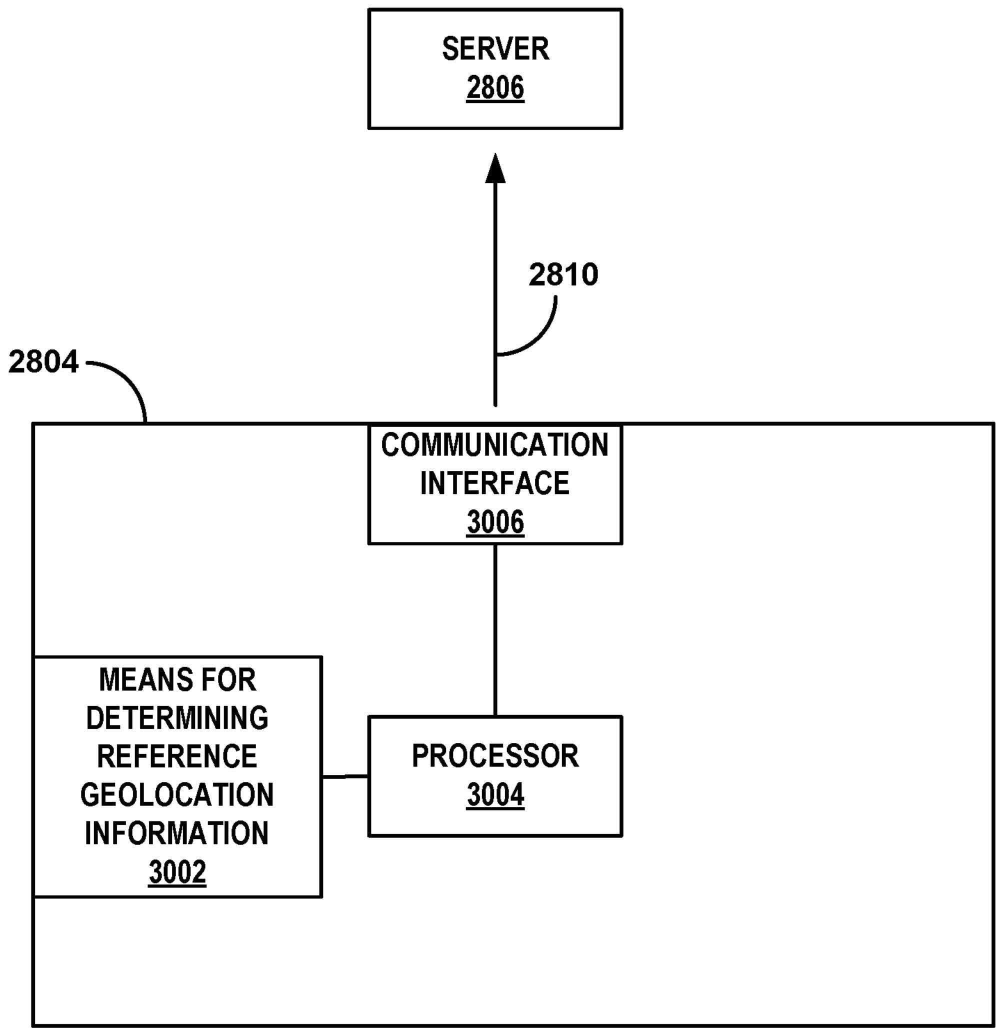
FIG. 30 shows a block diagram of an example of the reference geolocation device shown in FIG. 28.

FIG. 30 shows a block diagram of an example of reference geolocation device 2804 shown in FIG. 28. In the example shown in FIGS. 28 and 30, reference geolocation device 2804 comprises means for determining reference geolocation information of the reference geolocation 3002, processor 3004, communicably coupled (via communication interface 3006) to server 2806, to log a set of the determined reference geolocation information and to send at least a portion of the set of determined reference geolocation information to server 2806.

Figure 31:
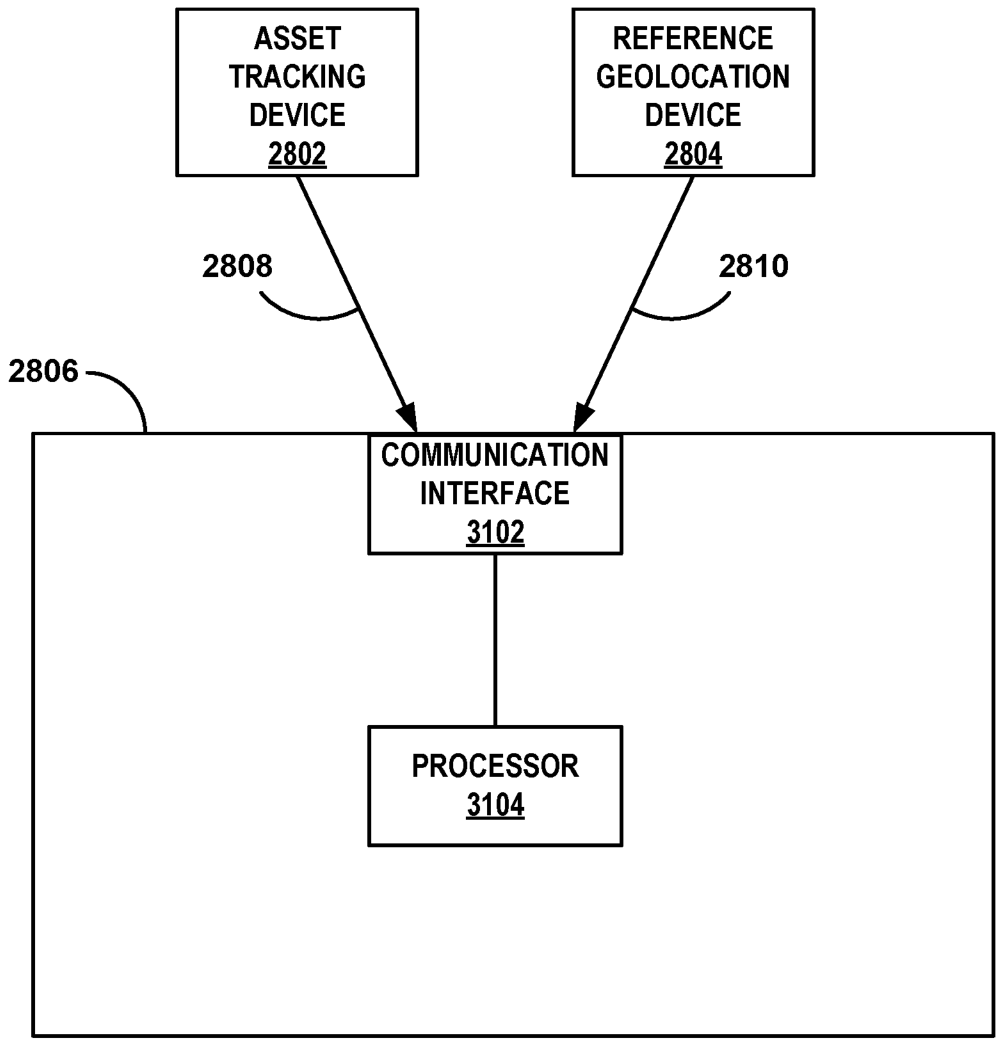
FIG. 31 shows a block diagram of an example of the server shown in FIG. 28.

FIG. 31 shows a block diagram of an example of server 2806 shown in FIG. 28. In the example shown in FIGS. 28 and 31, server 2806 comprises communication interface 3102 to receive, from asset tracking device 2802 via communication link 2808, preliminary geolocation information of the asset. Communication interface 3102 is further configured to receive, from reference geolocation device 2804 via communication link 2810, reference geolocation information. Server 2806 further comprises processor 3104 to calculate an error correction value based on at least a portion of the reference geolocation information and to adjust, based on the calculated error correction value, at least one value of the preliminary geolocation information of the asset to produce corrected geolocation information of the asset.

In some examples, geolocation information includes latitude and longitude information. In further examples, the means for determining preliminary geolocation information of the asset 2904 includes a first Global Navigation Satellite System (GNSS) receiver. In still further examples, the means for determining reference geolocation information of the reference geolocation 3002 includes a second GNSS receiver. In other examples, the means for determining preliminary geolocation information of the asset 2904 includes a Global Positioning System (GPS) receiver.

In the examples in which the means for determining preliminary geolocation information of the asset 2904 includes a first GNSS receiver and the means for determining reference geolocation information of the reference geolocation 3002 includes a second GNSS receiver, server 2906 may utilize processor 3104 to (1) calculate an average geolocation of the second GNSS receiver at the reference geolocation based on the set of determined reference geolocation information, (2) calculate an error correction value by comparing the calculated average geolocation of the second GNSS receiver to first reference geolocation information obtained at a first time, and (3) apply the calculated error correction value to first preliminary geolocation information of the asset obtained at the first time to produce corrected geolocation information of the asset.

In other examples, geolocation information includes altitude information. Thus, in some examples, the means for determining preliminary geolocation information of the asset 2904 includes a first air pressure sensor, and the means for determining reference geolocation information of the reference geolocation 3002 includes a second air pressure sensor. In the examples in which the means for determining preliminary geolocation information of the asset 2904 includes a first air pressure sensor and the means for determining reference geolocation information of the reference geolocation 3002 includes a second air pressure sensor, server 2906 may utilize processor 3104 to (1) calculate an altitude of the second air pressure sensor based on an air pressure reading taken at the reference geolocation, (2) calculate the error correction value by comparing the calculated altitude of the second air pressure sensor to a known altitude of the second air pressure sensor, (3) calculate an altitude of the first air pressure sensor based on an air pressure reading taken at the asset tracking device, and (4) apply the calculated error correction value to the calculated altitude of the first air pressure sensor to produce the corrected geolocation information of the asset. In further examples, server 2806 may also utilize processor 3104 to (1) calculate an average altitude of the second air pressure sensor based on a plurality of air pressure readings taken at the reference geolocation, and (2) utilize the calculated average altitude as the known altitude of the second air pressure sensor when calculating the error correction value.

In further examples, geolocation information includes latitude and longitude information and altitude information. In these examples, the means for determining preliminary geolocation information of the asset 2904 includes a first GNSS receiver and a first air pressure sensor, and the means for determining reference geolocation information of the reference geolocation 3002 includes a second GNSS receiver and a second air pressure sensor. Each of these components would be configured to function as set forth in one or more of the examples described herein.

Twenty-Fifth Embodiment

Figure 32:
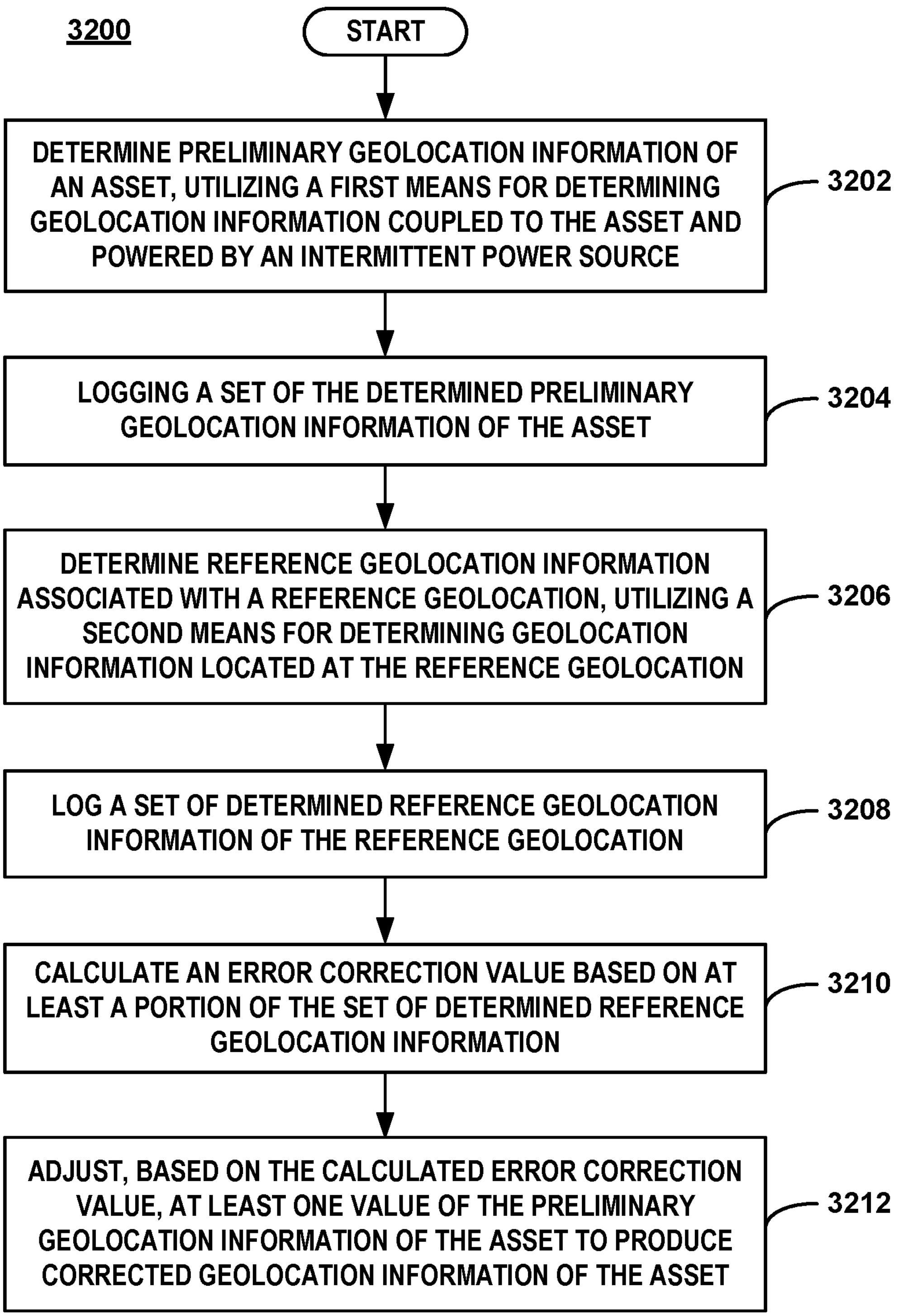
FIG. 32 is a flowchart of an example of a method for tracking a geolocation of an asset utilizing the system shown in FIG. 28.

FIG. 32 is a flowchart of an example of a method for tracking a geolocation of an asset utilizing the system shown in FIG. 28. The method 3200 begins at step 3202 with determining preliminary geolocation information of an asset, utilizing a first means for determining geolocation information coupled to the asset and powered by an intermittent power source. At step 3204, the method continues with logging a set of the determined preliminary geolocation information of the asset. At step 3206, the method continues with determining reference geolocation information associated with a reference geolocation, utilizing a second means for determining geolocation information located at the reference geolocation. At step 3208, the method continues with logging a set of the determined reference geolocation information of the reference geolocation. At step 3210, the method continues with calculating an error correction value based on at least a portion of the set of the determined reference geolocation information. At step 3212, the method continues with adjusting, based on the calculated error correction value, at least one value of the preliminary geolocation information of the asset to produce corrected geolocation information of the asset.

In some examples, method 3200 may further include transmitting at least a portion of the set of determined preliminary geolocation information of the asset to a server. In some examples in which at least a portion of the set of determined preliminary geolocation information of the asset is transmitted to a server, method 3200 may further include (1) transmitting at least a portion of the set of determined reference geolocation information of the reference geolocation to the server, and (2) the server calculating the error correction value and adjusting, based on the calculated error correction value, the at least one value of the preliminary geolocation information of the asset to produce the corrected geolocation information of the asset. In other examples in which at least a portion of the set of determined preliminary geolocation information of the asset is transmitted to a server, method 3200 may further include (1) transmitting, from a reference geolocation device located at the reference geolocation to the server, the calculated error correction value, and (2) the server adjusting, based on the calculated error correction value, the at least one value of the preliminary geolocation information of the asset to produce the corrected geolocation information of the asset.

In further examples, method 3200 may also include (1) transmitting at least a portion of the set of determined preliminary geolocation information of the asset to a reference geolocation device located at the reference geolocation, (2) the reference geolocation device calculating the error correction value and adjusting, based on the calculated error correction value, the at least one value of the preliminary geolocation information of the asset to produce the corrected geolocation information of the asset, and (3) transmitting, from the reference geolocation device to a server, the corrected geolocation information of the asset.

In still further examples, method 3200 may also include (1) transmitting, from a reference geolocation device located at the reference geolocation to an asset tracking device coupled to the asset and powered by the intermittent power source, at least a portion of the set of determined reference geolocation information of the reference geolocation, (2) the asset tracking device calculating the error correction value and adjusting, based on the calculated error correction value, the at least one value of the preliminary geolocation information of the asset to produce the corrected geolocation information of the asset, and (3) transmitting, from the asset tracking device to a server, the corrected geolocation information of the asset.

In other examples, one or more of the steps of method 3200 may be omitted, combined, performed in parallel, or performed in a different order than that described herein or shown in FIG. 32. In still further examples, additional steps may be added to method 3200 that are not explicitly described in connection with the example shown in FIG. 32.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

What is claimed is:

1. A system to determine a geolocation of an asset, the system comprising:
- a server;
- an asset tracking device coupled to the asset and powered by an intermittent power source, the asset tracking device comprising:
  - means for determining preliminary geolocation information of the asset,
  - a first processor to log a set of the determined preliminary geolocation information of the asset, and
  - a first transmitter to transmit at least a portion of the set of determined preliminary geolocation information to the server; and
- a reference geolocation device located at a reference geolocation, the reference geolocation device comprising:
  - means for determining reference geolocation information of the reference geolocation, and
  - a second processor communicably coupled to the server, the second processor to:
    - log a set of the determined reference geolocation information, and
    - send at least a portion of the set of determined reference geolocation information to the server,
- the server to:
  - calculate an error correction value based on at least a portion of the set of determined reference geolocation information, and
  - adjust, based on the calculated error correction value, at least one value of the preliminary geolocation information of the asset to produce corrected geolocation information of the asset.

2. The system of claim 1, wherein geolocation information includes latitude and longitude information.

3. The system of claim 2, wherein the means for determining preliminary geolocation information of the asset includes a first Global Navigation Satellite System (GNSS) receiver and the means for determining reference geolocation information of the reference geolocation includes a second GNSS receiver.

4. The system of claim 3, wherein the means for determining preliminary geolocation information of the asset includes a Global Positioning System (GPS) receiver.

5. The system of claim 3, wherein the server:
- calculates an average geolocation of the second GNSS receiver at the reference geolocation based on the set of determined reference geolocation information,
- calculates the error correction value by comparing the calculated average geolocation of the second GNSS receiver to first reference geolocation information obtained at a first time, and
- applies the calculated error correction value to first preliminary geolocation information obtained at the first time to produce the corrected geolocation information of the asset.

6. The system of claim 2, wherein geolocation information includes altitude information.

7. The system of claim 6, wherein the means for determining preliminary geolocation information of the asset includes a first air pressure sensor and the means for determining reference geolocation information of the reference geolocation includes a second air pressure sensor.

8. The system of claim 7, wherein the server:
- calculates an altitude of the second air pressure sensor based on an air pressure reading taken at the reference geolocation,
- calculates the error correction value by comparing the calculated altitude of the second air pressure sensor to a known altitude of the second air pressure sensor,
- calculates an altitude of the first air pressure sensor based on an air pressure reading taken at the asset tracking device, and
- applies the calculated error correction value to the calculated altitude of the first air pressure sensor to produce the corrected geolocation information of the asset.

9. The system of claim 8, wherein the server:
- calculates an average altitude of the second air pressure sensor based on a plurality of air pressure readings taken at the reference geolocation, and
- utilizes the calculated average altitude as the known altitude of the second air pressure sensor when calculating the error correction value.

10. The system of claim 1, wherein the intermittent power source is a photovoltaic (PV) array comprising one or more PV cells.

11. The system of claim 1, wherein the intermittent power source is a brake light system of a transport platform to which the asset is coupled.

12. The system of claim 1, wherein the intermittent power source is a tail light system of a transport platform to which the asset is coupled.

13. The system of claim 1, wherein the intermittent power source is a kinetic energy harvesting device.

14. The system of claim 13, wherein the kinetic energy harvesting device harvests kinetic energy from ambient fluid moving around the asset.

15. The system of claim 13, wherein the kinetic energy harvesting device harvests kinetic energy from a rotating wheel component of a transport platform to which the asset is coupled.

16. The system of claim 13, wherein the kinetic energy harvesting device is a piezoelectric device.

17. The system of claim 13, wherein the kinetic energy harvesting device comprises:
- an inductor; and
- a magnet disposed such that relative movement between the magnet and the inductor caused by movement of a transport platform to which the asset is coupled induces electrical power.

* * * * *